US009597796B2

(12) United States Patent
Rollinson et al.

(10) Patent No.: US 9,597,796 B2
(45) Date of Patent: Mar. 21, 2017

(54) SYSTEMS AND METHODS FOR MODULAR UNITS IN ELECTRO-MECHANICAL SYSTEMS

(71) Applicant: Carnegie Mellon University, CTTEC, Pittsburgh, PA (US)

(72) Inventors: David Rollinson, Pittsburgh, PA (US); Florian Enner, Pittsburgh, PA (US); Matthew Tesch, Pittsburgh, PA (US); Howie Choset, Pittsburgh, PA (US); Frederic Curtis Layton, Pittsburgh, PA (US)

(73) Assignee: Carnegie Mellon University, CTTEC, Pittsburgh, PA (US)

( * ) Notice: Subject to any disclaimer, the term of this patent is extended or adjusted under 35 U.S.C. 154(b) by 0 days.

(21) Appl. No.: 14/708,360

(22) Filed: May 11, 2015

(65) Prior Publication Data

US 2015/0321348 A1     Nov. 12, 2015

Related U.S. Application Data

(60) Provisional application No. 61/991,078, filed on May 9, 2014, provisional application No. 61/991,665, filed on May 12, 2014.

(51) Int. Cl.
*B25J 9/00* (2006.01)
*B25J 9/08* (2006.01)
*B25J 9/12* (2006.01)
*B25J 9/06* (2006.01)

(52) U.S. Cl.
CPC ............. *B25J 9/08* (2013.01); *B25J 9/065* (2013.01); *B25J 9/12* (2013.01); *Y10S 901/23* (2013.01)

(58) Field of Classification Search
CPC ........................................................ B25J 9/08
See application file for complete search history.

(56) References Cited

U.S. PATENT DOCUMENTS

| 5,355,743 A | * | 10/1994 | Tesar | B25J 9/08 475/149 |
| 6,084,373 A | * | 7/2000 | Goldenberg | B25J 9/08 318/568.11 |
| 6,450,104 B1 | * | 9/2002 | Grant | B08B 9/049 104/138.1 |
| 6,454,624 B1 | * | 9/2002 | Duff | A63H 33/042 414/915 |
| 6,636,781 B1 | * | 10/2003 | Shen | B08B 9/045 318/568.11 |
| 6,708,068 B1 | * | 3/2004 | Sakaue | B25J 9/08 318/568.11 |

(Continued)

OTHER PUBLICATIONS

Dynamic Servo Actuators; Datasheet [online] Danaher Motion; Oct. 10, 2004.

(Continued)

*Primary Examiner* — Jonathan L Sample
(74) *Attorney, Agent, or Firm* — Jones Day

(57) ABSTRACT

Systems and methods are provided for an electro-mechanical system. A system includes a plurality of connected modules. A first module of the modules includes an actuator for imparting motion on the electro-mechanical system and a data processor configured to sense a state of the first module and to command the actuator to modify the state of the first module.

37 Claims, 25 Drawing Sheets

(56) References Cited

U.S. PATENT DOCUMENTS

| | | | | |
|---|---|---|---|---|
| 6,988,008 B2* | 1/2006 | Hudson | G05B 19/0421 | 700/1 |
| 7,895,257 B2* | 2/2011 | Helal | H04L 12/2803 | 700/245 |
| 8,196,492 B1* | 6/2012 | Denu | B25J 9/042 | 414/744.5 |
| 8,677,920 B1* | 3/2014 | Jeng | B63B 3/08 | 114/312 |
| 8,868,238 B1* | 10/2014 | Gray | G05D 1/0088 | 700/258 |
| 8,903,558 B2* | 12/2014 | Jarrell | F17D 5/00 | 700/282 |
| 2002/0053893 A1* | 5/2002 | Khairallah | B25J 9/08 | 318/568.1 |
| 2003/0038607 A1* | 2/2003 | Yim | B25J 9/08 | 318/568.11 |
| 2004/0037558 A1* | 2/2004 | Beshai | H04Q 11/0005 | 398/57 |
| 2004/0073404 A1* | 4/2004 | Brooks | G05B 19/409 | 702/183 |
| 2004/0133311 A1* | 7/2004 | Park | A63H 3/46 | 700/245 |
| 2007/0219666 A1* | 9/2007 | Filippov | H04L 67/12 | 700/245 |
| 2007/0225620 A1* | 9/2007 | Carignan | A61H 1/0281 | 601/5 |
| 2008/0121097 A1* | 5/2008 | Rudakevych | F41A 19/58 | 89/28.05 |
| 2008/0133052 A1* | 6/2008 | Jones | B25J 5/007 | 700/245 |
| 2008/0249640 A1* | 10/2008 | Vittor | B25J 9/06 | 700/9 |
| 2009/0171151 A1* | 7/2009 | Choset | A61B 1/00006 | 600/114 |
| 2010/0030377 A1* | 2/2010 | Unsworth | B25J 9/06 | 700/245 |
| 2010/0250043 A1* | 9/2010 | Scheucher | B60L 8/00 | 701/22 |
| 2011/0071679 A1* | 3/2011 | Barajas | B25J 9/1674 | 700/259 |
| 2011/0231017 A1* | 9/2011 | Takeda | B62D 57/032 | 700/250 |
| 2012/0204670 A1* | 8/2012 | Ryland | B08B 9/045 | 74/490.03 |
| 2012/0215348 A1* | 8/2012 | Skrinde | B08B 9/049 | 700/245 |
| 2012/0317325 A1* | 12/2012 | Zhang | H04M 1/72527 | 710/301 |
| 2013/0054024 A1* | 2/2013 | Bruemmer | G06K 9/00791 | 700/245 |
| 2013/0245825 A1* | 9/2013 | Vicentini | B25J 9/1674 | 700/253 |
| 2013/0247537 A1* | 9/2013 | Zubiate | B25J 9/06 | 59/78 |
| 2013/0325182 A1* | 12/2013 | Setrakian | B25J 9/161 | 700/264 |
| 2014/0078889 A1* | 3/2014 | Diab | H04L 67/327 | 370/221 |
| 2014/0229004 A1* | 8/2014 | Dooley | B25J 9/1658 | 700/248 |
| 2014/0273730 A1* | 9/2014 | Brandwijk | A63H 33/042 | 446/484 |
| 2015/0258682 A1* | 9/2015 | Izikevich | B25J 9/0009 | 700/245 |
| 2015/0258683 A1* | 9/2015 | Izhikevich | B25J 9/163 | 700/250 |

OTHER PUBLICATIONS

International Search Report and Written Opinion, PCT/US2015/030088; mailed Aug. 7, 2015.

* cited by examiner

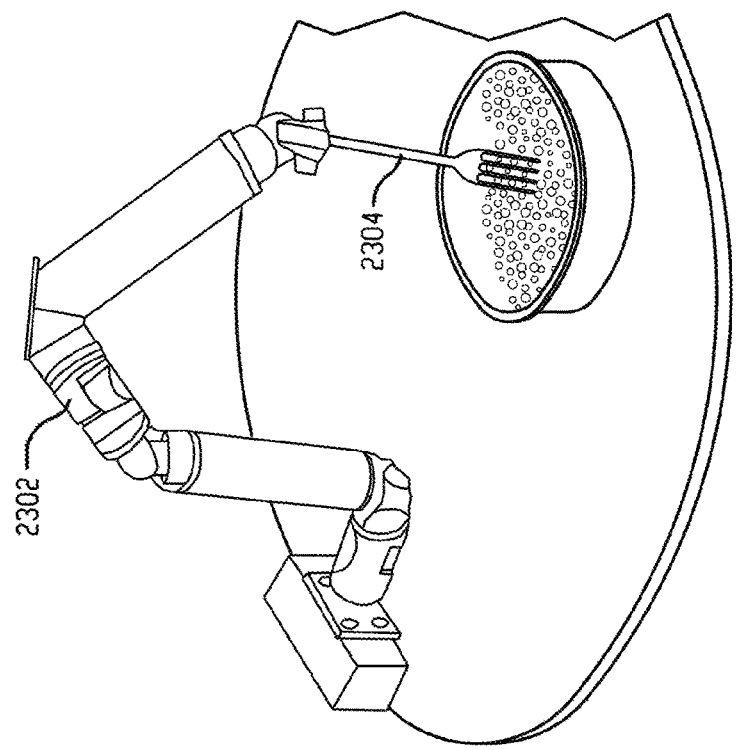
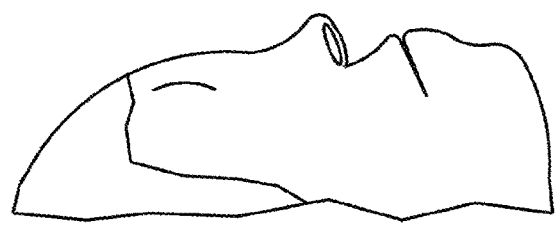
Fig. 23

SYSTEMS AND METHODS FOR MODULAR UNITS IN ELECTRO-MECHANICAL SYSTEMS

CROSS-REFERENCE TO RELATED APPLICATIONS

This application claims priority to U.S. Provisional Application No. 61/991,078, filed May 9, 2014, entitled "Modularity in the Context of Snake Robots," and U.S. Provisional Application No. 61/991,665, filed May 12, 2014, entitled "Modular Robotic Units," the entirety of both of which is herein incorporated by reference.

This disclosure is related to U.S. patent application Ser. No. 14/286,316, filed May 23, 2014, the entirety of which is herein incorporated by reference.

TECHNICAL FIELD

The technology described herein relates generally to electro-mechanical systems and more specifically to modular units as components for electro-mechanical systems.

BACKGROUND

Electro-mechanical devices, devices that involve the use of an electrical signal to create mechanical movement or vice versa, have a myriad of uses from assembly line automation to electric typewriters to car starter motors. Additional applications for electro-mechanical devices are limited only by human ingenuity, with further implementations being developed on a daily basis. Such a continually evolving technology would benefit from modular "building blocks" from which a wide variety of electro-mechanical systems could be created with minimal setup and configuration.

SUMMARY

Systems and methods are provided for an electro-mechanical system. A system includes a plurality of connected modules. A first module of the modules includes an actuator for imparting motion on the electro-mechanical system and a data processor configured to sense a state of the first module and to command the actuator to modify the state of the first module.

BRIEF DESCRIPTION OF THE FIGURES

FIGS. 23-25 depict example operations of electro-mechanical systems.

DETAILED DESCRIPTION

Figure 1:
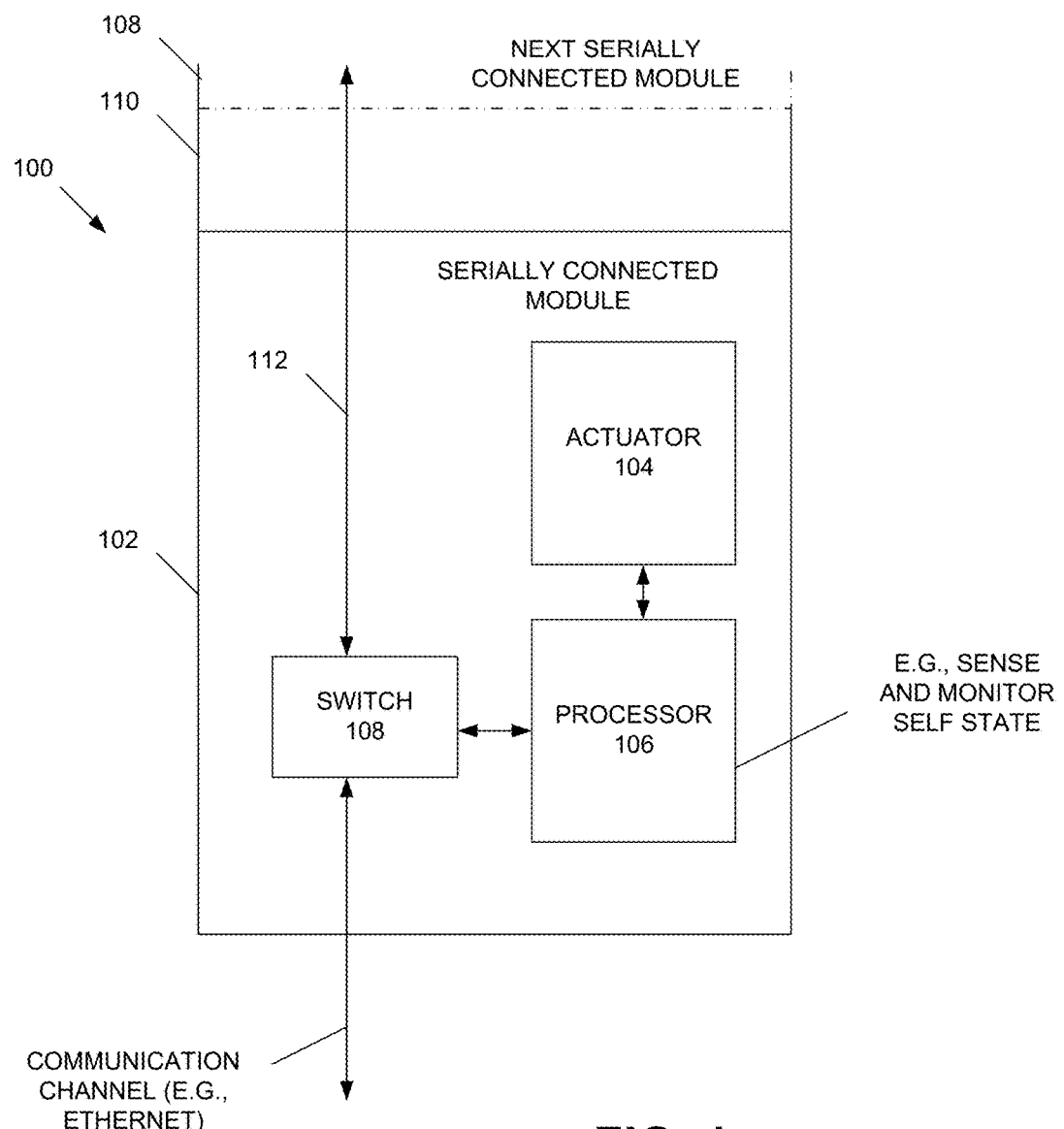
FIG. 1 is a block diagram depicting a first module of a plurality of connected modules that can be integrated to form an electro-mechanical system.

FIG. 1 is a block diagram depicting a first module 102 of a plurality (2 or more) of connected modules that can be integrated to form an electro-mechanical system. An electro-mechanical system, in one embodiment of the disclosure, includes a plurality of connected modules. The first module 100 includes a body 102 into which an actuator 104 for imparting motion on the electro-mechanical system is positioned. The first module 100 further includes a data processor 106. The data processor 106 is configured to sense a state of the first module 100 and to command the actuator 104 to modify the state of the first module 100. For example, an external entity could command the electro-mechanical system to assume a certain shape or perform a certain action, and the processors of the modules, including first module 100 would operate to realize that command through self state monitoring and commanding of the actuator 104.

The first module 100 is connected to one or more additional modules, such as a next, second connected module 108. The second module 108 is physically connected to the first module 100, such as via a threaded collar 110, as discussed further herein. The second module 108 is further connected to the first module via a communication channel 112 that runs between modules (e.g., modules 100, 108) and, in one example, to an external entity. In one embodiment of the disclosure, the communication channel operates using an Ethernet standard (e.g., transporting encrypted data and commands), where in one example that communication channel operates using a TCP/IP protocol. The use of such a ubiquitous protocol enables easily set up communications among modules as well as incorporation of a variety of off-the-shelf ancillary hardware (e.g., sensor hardware such as digital cameras, IR sensors, microphones, chemical sensors) effort. While an Ethernet standard in some configurations may not guarantee delivery of all communications on the channels (although such guarantees can be made using other means), the wide presence of Ethernet-capable hardware and relative ease of setup, in some embodiments, makes Ethernet a preferable choice over more-hardened protocols, such as EtherCAT. To facilitate communications, the first module 100 includes a three-port switch 108 by which the first module 100 can relay communications among the processor 106 of the first module 100, the second module 108 and other modules and any external entity, such as an external entity from which commands are received. A system using a three-port switch 108 can facilitate connecting modules in a serial fashion (e.g., end-to-end). In other embodiments, switches having more ports could be implemented to facilitate non-serial connections of modules or integration of communications with entities (e.g., other sensors or actuators) associated with a module (e.g., first module 100) without such data first traversing processor 106.

Electro-mechanical systems can be formed in a variety of topologies using modules such as those described herein. Certain modules can be reused in different topologies, providing flexibility and easy integration as needed for a given application. In one embodiment, certain or all of the modules in an electro-mechanical system are identical, while in other embodiments an assortment of different types of modules are utilized in implementing a desired electro-mechanical system. In one embodiment of the disclosure, the modules are programmed with intelligence for detecting their configuration and operate according to that detected configuration, as described further herein.

Figure 2:
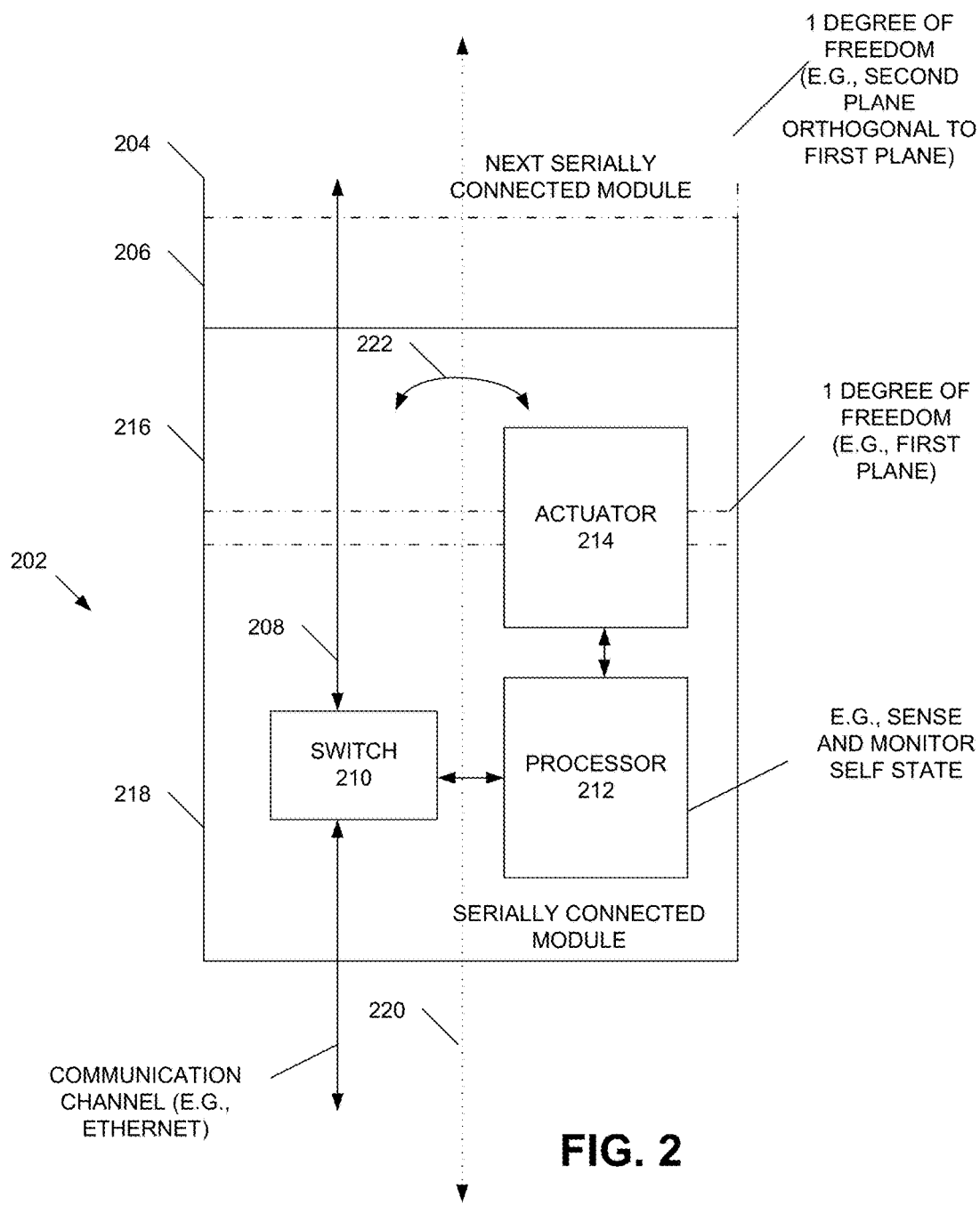
FIG. 2 is a block diagram depicting first and second connected modules, each having one degree of freedom for imparting motion on an electro-mechanical system.

FIG. 2 is a block diagram depicting first and second connected modules, each having one degree of freedom for imparting motion on an electro-mechanical system. An electro-mechanical system includes a first module 202 and a second module 204 connected end-to-end. The connection includes a physical connection 206 and a data connection via a communication channel 208 that enables communications among modules 202, 204 and any external entity providing commands to the electro-mechanical system via a switch 210. A processor 212 of the first module 202 communicates with external entities via the communication channel 208 and further with an actuator 214 that is configured to impart motion on the first module 202 itself and further to the electro-mechanical system. In one embodiment of the disclosure, other modules, such as the second module 204 also include actuators for imparting motion to those modules and further moving the electro-mechanical system. Types of actuators and motions that can be imparted on modules (e.g., 202, 204) and the larger electro-mechanical system can take a variety of forms including translational motion (e.g., extension, contraction), rotational motion, and oscillatory motion.

In the example side view of FIG. 2, the first module 202 includes an actuator 214 for imparting rotational motion of a first end 216 of the first module 202 relative to a second end 218, giving the module 202 one degree of freedom of movement. In that example, the actuator 214 is configured to impart a torque, such that the first end 216 rotates relative to a first axis 220, as indicated at 222. The actuator 214 may impart torques and corresponding motion on the first module 202 in accordance with commands received from the processor 212. In addition to the first module 202 having a degree of freedom of motion and an actuator 214 for imparting motion in that degree of freedom, other modules, such as the second module may also have a degree of freedom of motion that may or may not be aligned with the degree of freedom of the first module 202. In one embodiment of the disclosure, a degree of freedom of the second module 204 is orthogonal to the degree of freedom of the first module 202. In other embodiments, the degree of freedom of the second module 204 is not orthogonal (e.g., is offset 30 degrees, 45 degrees, 60 degrees) to the degree of freedom of the first module 202. In other embodiments of the disclosure, the freedom of motion of the first module 202 may be more or less than 90 degrees in each direction relative to the first axis 220. While the example of FIG. 2 depicts each module having one degree of freedom, other exemplary modules may have more, fewer, or different degrees of freedom, as described further herein.

Figure 3:
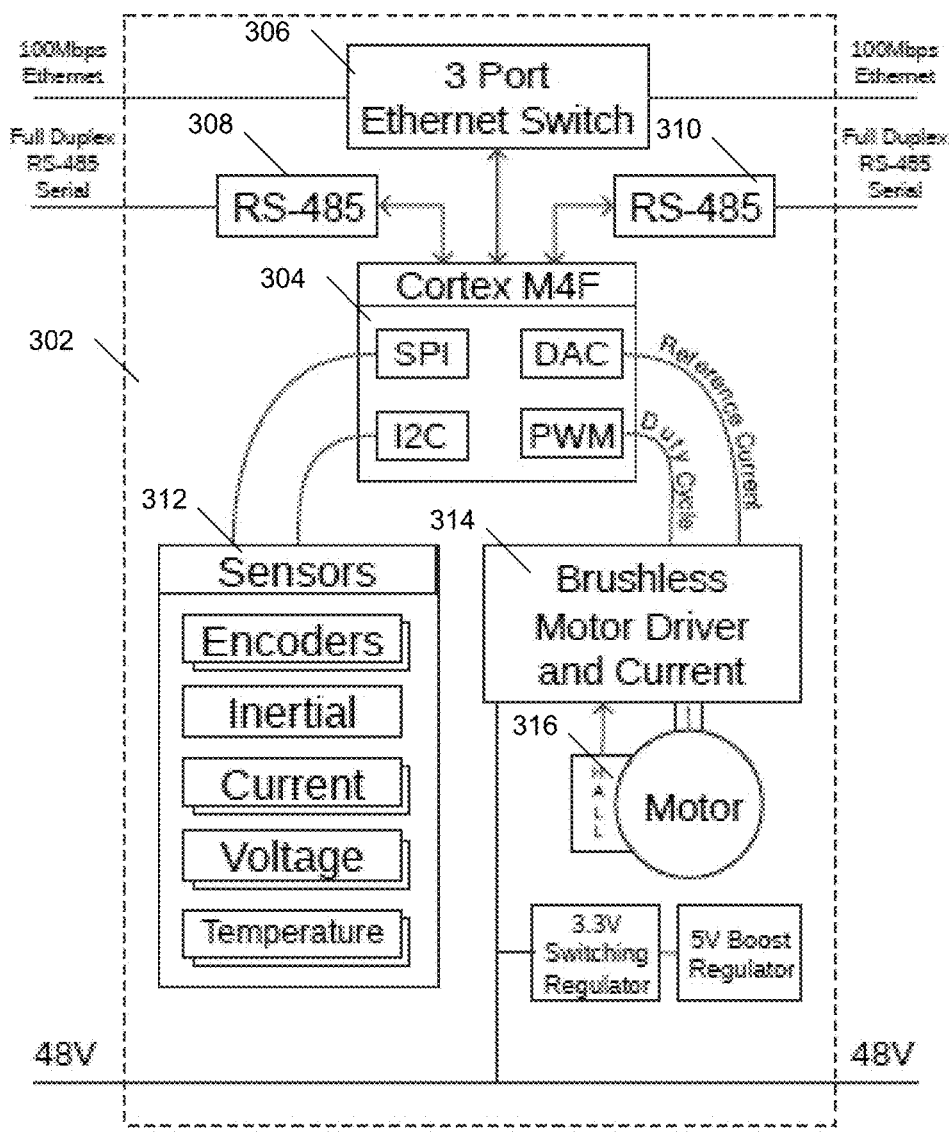
FIG. 3 is a block diagram depicting an example implementation of a module of an electro-mechanical system.

FIG. 3 is a block diagram depicting an example implementation of a module of an electro-mechanical system. The module 302 includes a processor 304 that takes the form of a Cortex M4F processor. The processor 304 is configured to communicate with upstream (e.g., a second module) and downstream (e.g., a third module and a fourth module) modules and external entities via an Ethernet protocol facilitated by a three port Ethernet switch 306. The processor is further responsive to two serial communication interfaces 308, 310 for communicating with a neighboring (e.g., immediately neighboring) upstream module and a neighboring downstream module, respectively. The processor 304 is also in communication with one or more sensors and accompanying encoders, such as sensor suite 312. In the example of FIG. 3, the module 302 includes an inertial measurement unit sensor, a current sensor, a voltage sensor, and a temperature sensor. In other implementations, modules may include fewer or more sensors (e.g., video capture sensors, microphones). The module 302 also includes components 314, 316 that perform the functionality of an actuator for imparting motion on the module 302. In the example of FIG. 3, the actuator includes a brushless motor driver and current motor for imparting motion (e.g., rotational motion) on a portion of the module 302 or something connected to the module, where examples are described further herein. The modules are further configured to pass power to one another when connected, such that all modules can be powered by an external power source. The modules may further include batteries for internal power storage and may include functionality for autonomous power generation (e.g., via integrated solar cells). In one embodiment, a battery module includes internal batteries for storing power and distributing that power to other modules, such that an electro-mechanical system could operate tetherlessly, without access to an external power source.

Figure 4:
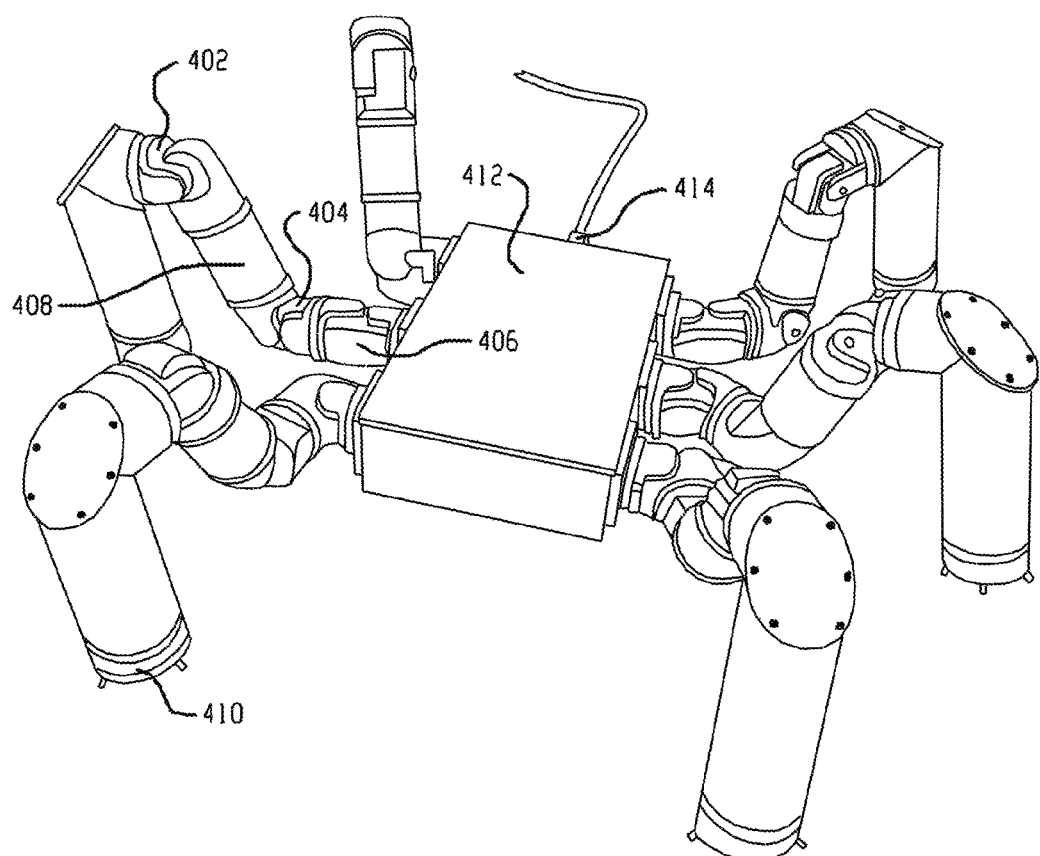
FIG. 4 is a diagram depicting a plurality of modules integrated into a multi-legged robot having six legs.

The modules as described herein can be assembled in countless configurations to implement a desired electro-mechanical system. FIG. 4 is a diagram depicting a plurality of modules integrated into a multi-legged robot having six legs. The multi-legged robot is able translate via walking on its legs and can grasp objects via grippers integrated into a head module or hand module. The multi-legged robot may further include a variety of sensors for providing data for operation of the electro-mechanical system and for analysis by an operator (e.g., a user, or an external entity such as a server issuing commands to the multi-legged robot). Multi-legged robots can be implemented having 1 to n legs, where n is an integer greater than 1. The six-legged robot of FIG. 4 includes three identical modules 402, 404, 406 connected in each leg. Each of the modules 402, 404, 406 has one degree of freedom, where in the example of FIG. 4, the degree of freedom for module 402 is orthogonal to that of module 404. A spacer module 408 is positioned between modules 404 and 406, where that spacer module 408 may include hardware to propagate communications among all of the modules, without offering an actuator and a capacity to impart motion. A rigid foot module 410 is positioned at the end of each leg. The foot module 410 may include no electronics, or in one embodiment may include actuators, sensors, or other hardware for implementing a desired function of the multi-legged robot. In one example, the foot module 410 includes a force sensor. A body module 412 facilitates communications among the modules of different legs and an external entity via communication port 414, such as providing a multi-port switch for transmitting messages sent among such hardware via an Ethernet standard. In one embodiment, additional modules are incorporated into the multi-legged robot, such as a gripper module, as disclosed further herein. Such a gripper module could be attached to the body module 412 to act as a head for the multi-legged robot for gripping or could be attached to one of the legs (e.g., to an end of module 402) to operate as a hand.

Figure 5:
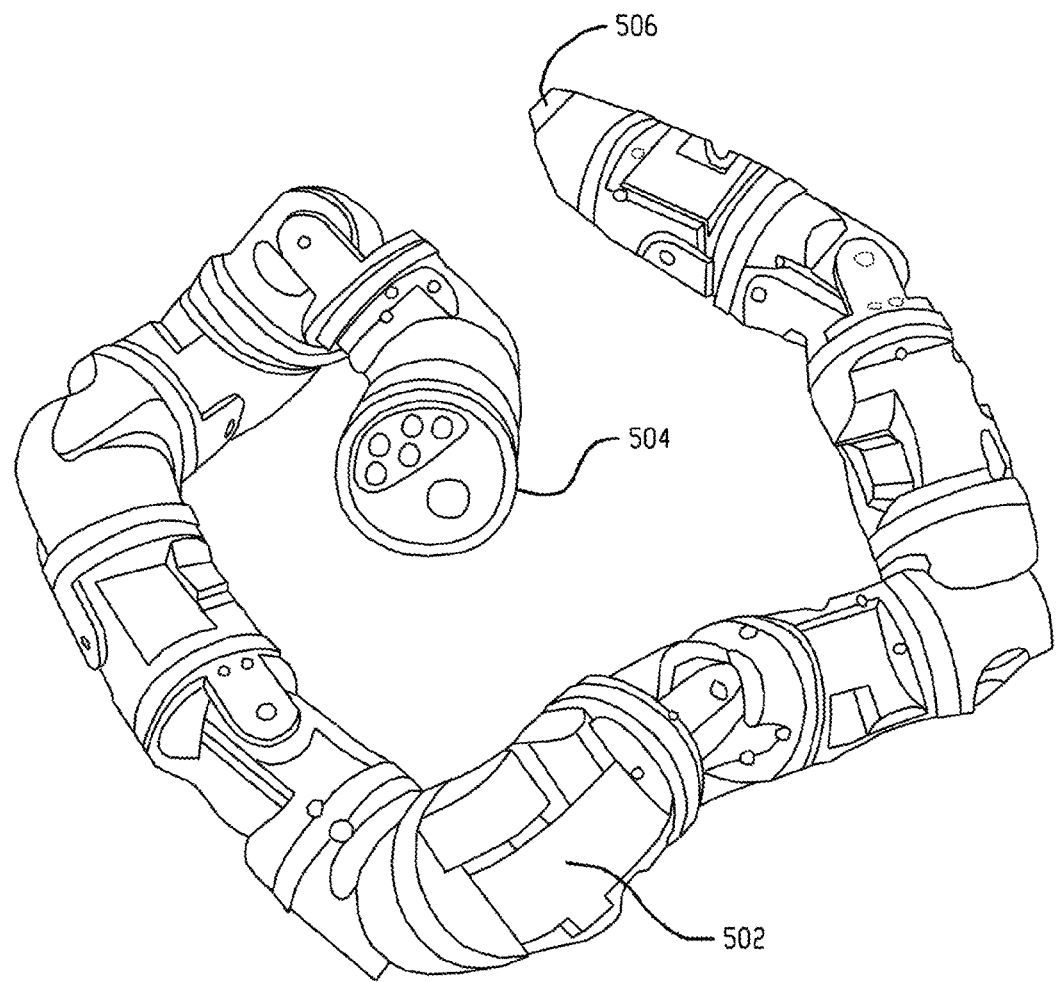
FIG. 5 is a diagram depicting another arrangement of a plurality of modules in a snake configuration for an electro-mechanical system.

FIG. 5 is a diagram depicting another arrangement of a plurality of modules in a snake configuration for an electro-mechanical system. The electro-mechanical system of FIG. 5 includes 14 identical modules (e.g., module 502) having one degree of freedom each, where motion in that degree of freedom for a particular module 502 is controlled by a processor and an actuator in that module 502. The modules are physically connected in a serial fashion and further are connected to one another for data transmission via a data channel (e.g., Ethernet) passed from one module to the next along the series of modules. The snake configuration can translate in a variety of ways, such as in a slithering motion, a rolling motion, or other rotational means. In addition to the identical modules, the snake robot includes a head module 504 that includes a variety of sensors (e.g., a video camera) and other hardware (e.g., a light) that may not be present on other modules of the snake robot. In one embodiment, the head module 504 includes a high-definition camera that provides a live video feed while four LEDs are available for illuminating darker environments. In one embodiment, the camera is an off-the-shelf IP camera, enabled by an Ethernet communication bus running through the modules. A tail module 506 of the snake configuration includes a data port for connection to an external entity for receiving commands and outputting data including state data for the electro-mechanical system and detected sensor data. In one embodiment, the tail module 506 includes a magnetic structure to support an extended Ethernet tether as well as an integrated slip ring. In such an embodiment, the tether connector supports two high-current power conductors and six signal conductors.

Figure 6:
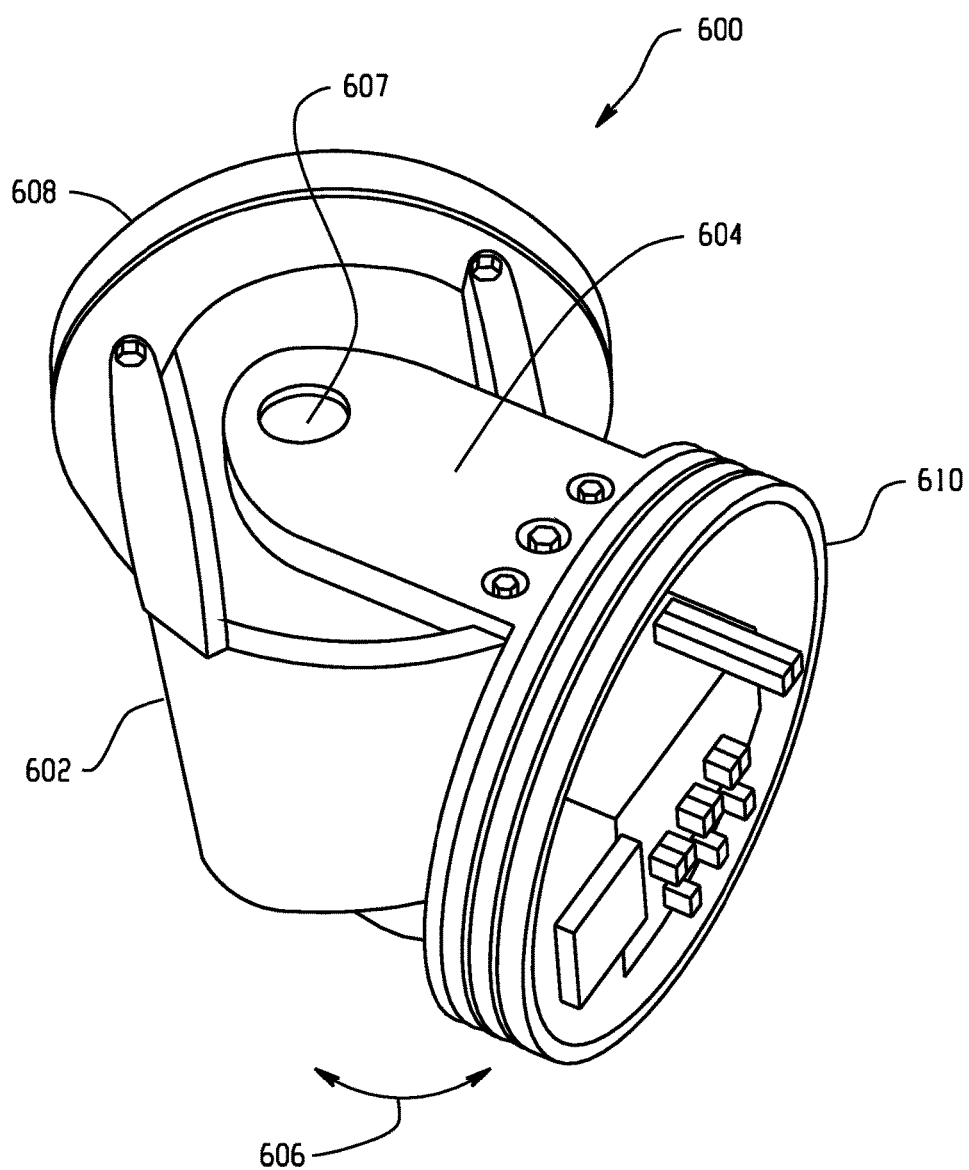
FIGS. 6-8 depict an example module that is configured to be connected to other modules to form an electro-mechanical system.
Figure 7:
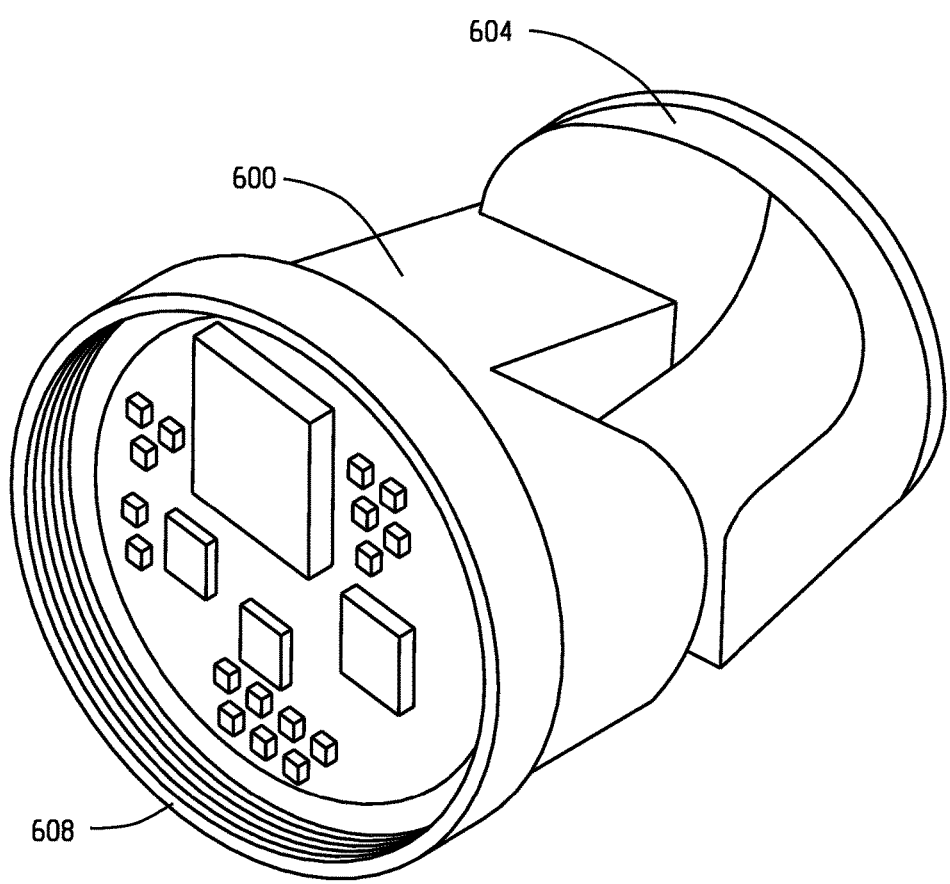
Figure 8:
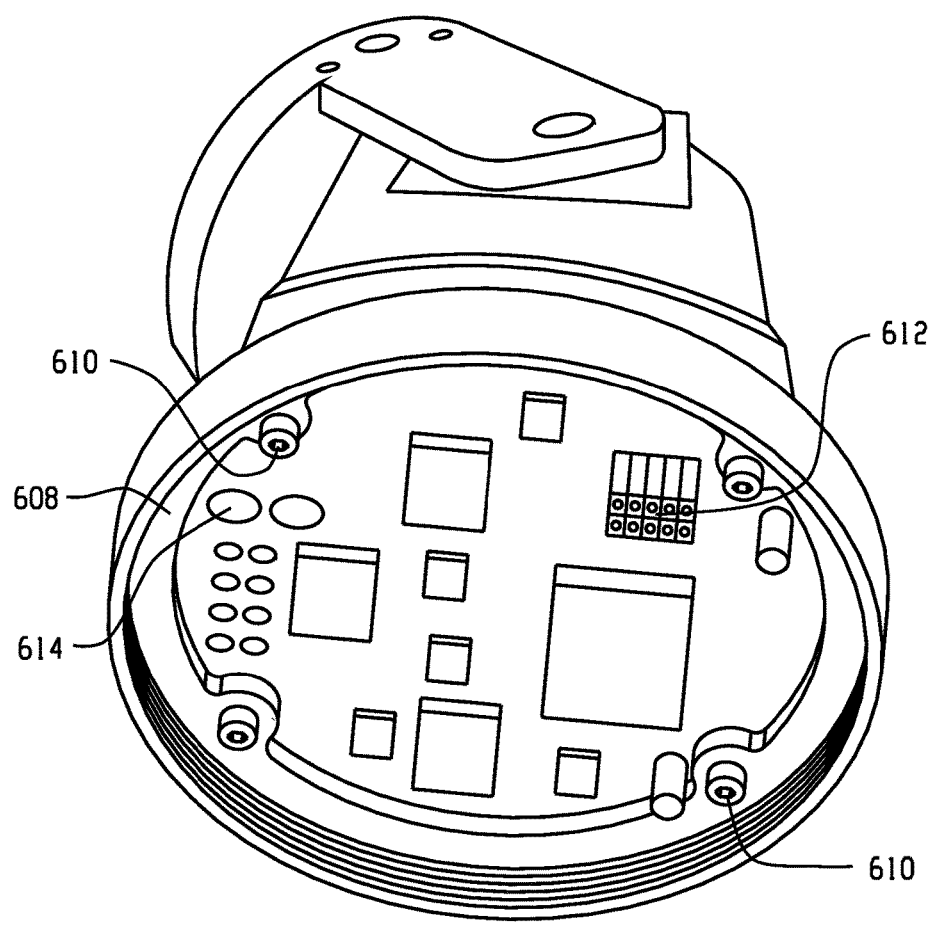

FIGS. 6-8 depict an example module that is configured to be connected to other modules to form an electro-mechanical system. With reference to FIG. 6, the exterior of the module comprises two segments 602, 604. A first segment 602 includes a data processor and an actuator for imparting motion on the module 600. The processor and the actuator act in concert to impart a torque that rotates the first segment 602 and the second segment 604 relative to one another in a first degree of freedom, indicated at 606, by rotation of a shaft 607. Rotation of the shaft 607 imparts a predictable shearing force on an elastic element within the first portion 602, such that the processor and actuator can impart a particular torque to the shaft to impart a predictable amount of rotation of the second segment 604 relative to the first portion 602. In the example of FIG. 6, the actuator is capable of imparting torques such that the second segment 604 can be rotated to 90 degrees relative to the first segment 602 in either direction, providing 180 degrees in available movement. In one embodiment, the housing of a module is machined from 7075 aluminum and anodized red to prevent wear and corrosion.

An inter-module portion 608, 610 at either end of the module 600 provides for both physical and data connectivity between modules when connected. In one embodiment, the inter-module 608, 610 includes a rugged, tool-less design. Modules can be aligned using dowel pins and matching recesses. A rotatable threaded collar, illustrated at inter-module portion 608, is held in place by a retaining ring, and can be turned by hand to lock adjacent rings together via the threads depicted at inter-module portion 610. In one embodiment, such connections meet IP68, water submersible, standards. Electrical connection between two modules can be made with spring-pin connectors on an interface board touching target areas on a control board of an adjacent module. Such arrangement is more tolerant to misalignment, where bent or broken pins can be an issue. O-rings can be included to seal the collar at both ends. Any device with matching threads, a common power cabling, and a common communication protocol wiring (e.g., Ethernet) can be interfaced with a module, allowing for freedom of design and customization with modules of varying type.

Figure 9:
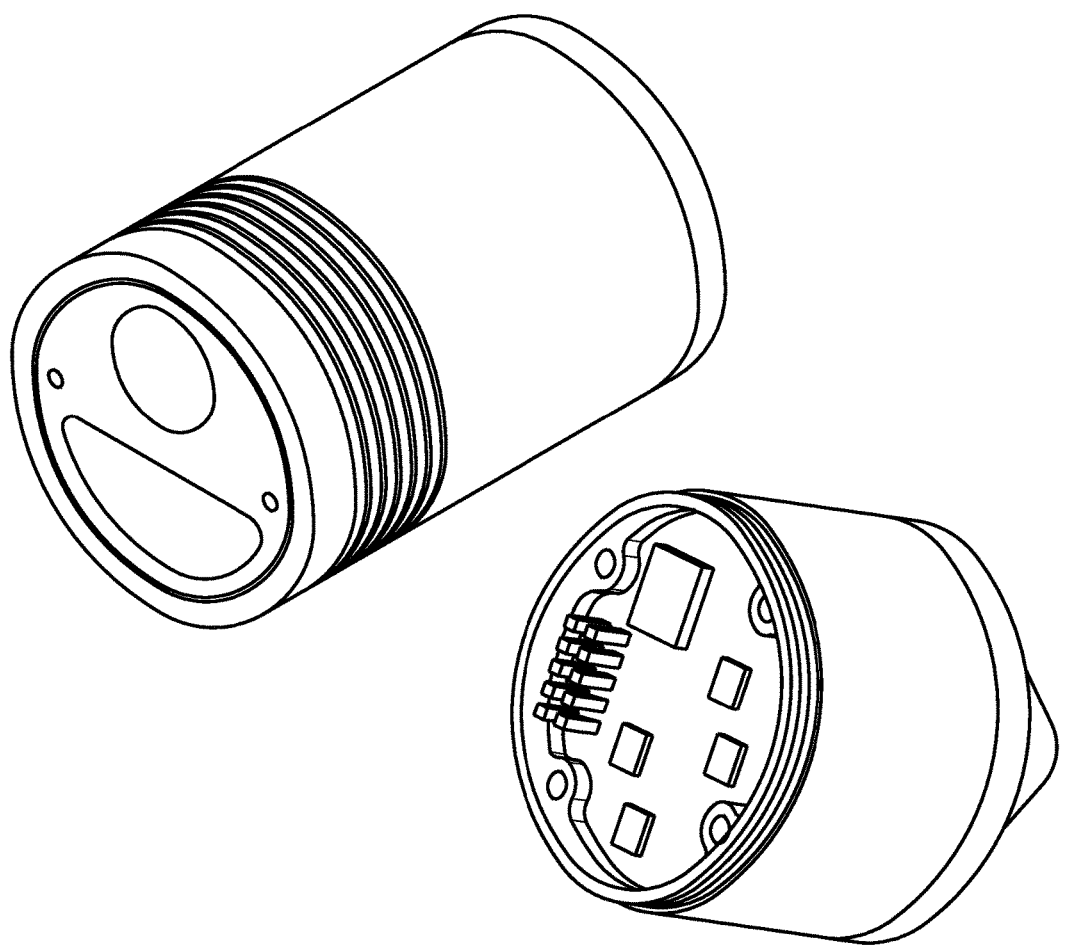
FIG. 9 depicts an example head module on the left and an example tail module on the right.

FIG. 7 depicts the module in a neutral state, where the first segment 602 and the second segment are aligned with no rotation relative to one another. The view of FIG. 7 depicts the rotatable threaded collar and the data and power connectivity provided at inter-module portion 608. FIG. 8 depicts a close up view of inter-module portion, where dowel pin recesses 610, data connectivity ports 612, and power transmitting target areas can be more easily visualized. FIG. 9 depicts an example head module on the left and an example tail module on the right.

Figure 10:
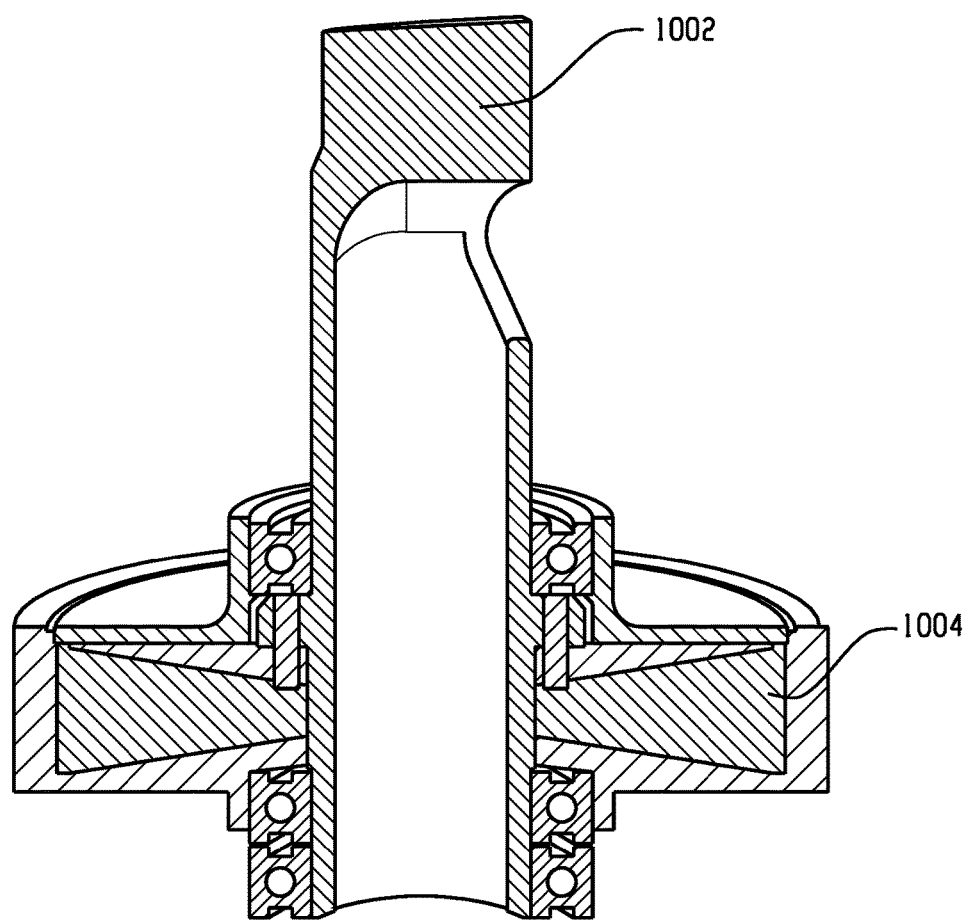
FIG. 10 is a diagram depicting a rotatable shaft with which an actuator interacts to impart motion on an example module of an electro-mechanical system.

FIG. 10 is a diagram depicting a rotatable shaft with which an actuator interacts to impart motion on an example module of an electro-mechanical system. The actuator is configured to apply a torque to the shaft 1002, which sits in the first segment of a module, as depicted at 602 in FIG. 6, rotating the second segment, as depicted at 604 in FIG. 6. An elastic element 1004, such as the tapered elastic element depicted in FIG. 10, has a shearing force applied to it when the actuator rotates the shaft 1004. The shearing force applied to the elastic element 1004 for different degrees of rotation of the shaft 1002 is predictable, such that the actuator and processor know an amount of torque to impart on the shaft 1002 to achieve a desired amount of rotation of the module segments. Periodic re-calibration operations can be performed to update necessary levels of torque for achieving desired rotation amounts, such as to address changing conditions of the elastic element 1004 or other aspects of the module.

Figure 11:
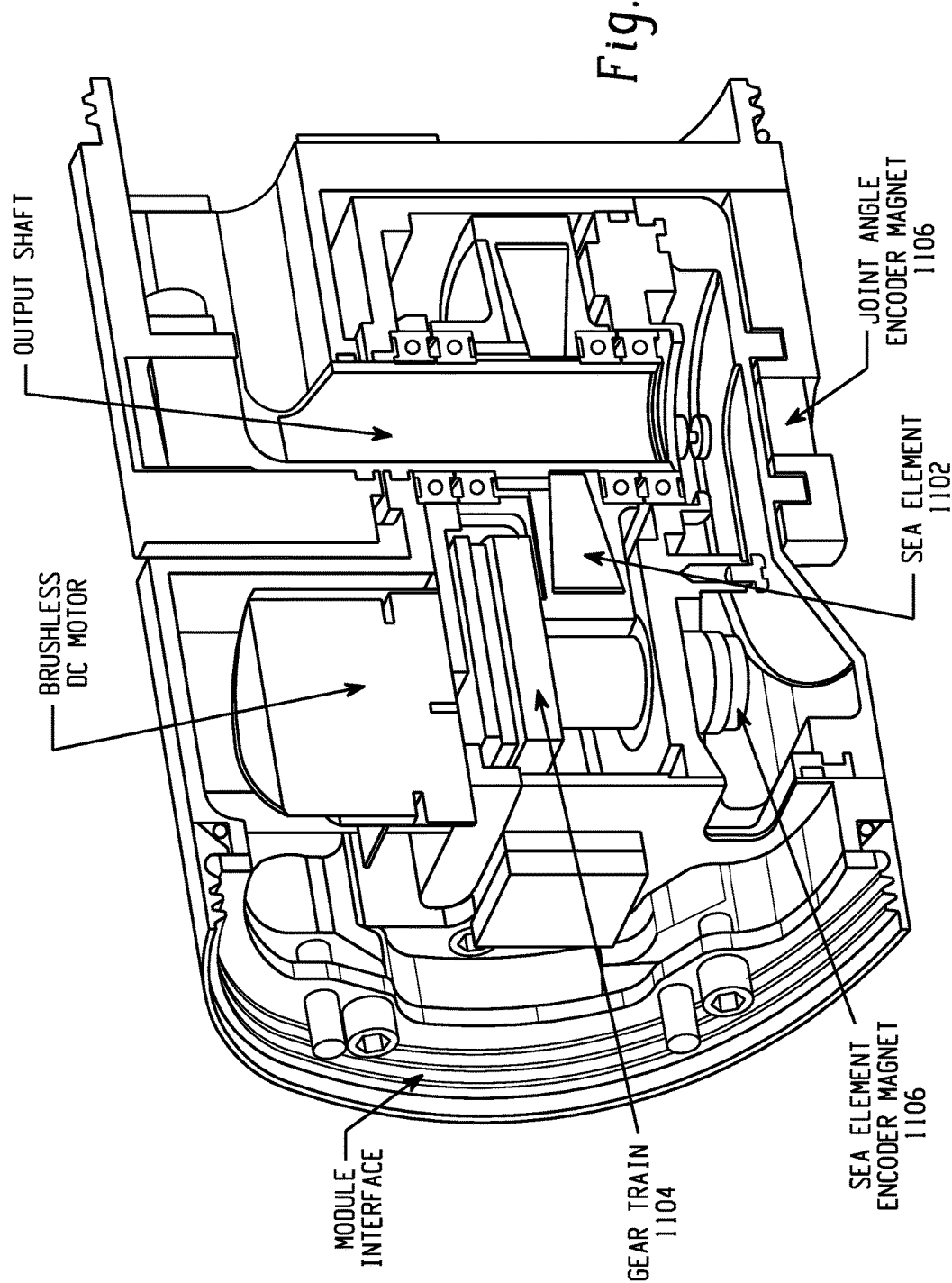
FIG. 11 depicts a cross-section of the example module shown in FIG. 6.

FIG. 11 depicts a cross-section of the example module shown in FIG. 6. As shown in FIG. 11, an elastic element 1102 that has a conical taper cross-section is embedded in a final stage of a gear train 1104 of the module. The elastic element 1102 includes a conically shaped layer of rubber molded into the final stage. In some embodiments, the module includes two encoders 1106 (e.g., magnetic encoders) that measure the input and output angles of the elastic element 1102.

Calibration for the actuator can be performed using one or more models (e.g., linear models, Norton/Thevenin damped models, Buc-Wen hysteresis models) of which certain parameters of the current state of the actuator can be determined, e.g., based on motor current and/or internal sensors (such as encoders and temperature sensors). For example, calibration for the actuator is performed by measuring a motor current of the actuator's highly geared motor and using a simple linear model for an estimated torque of the elastic element 1102. Particular operating conditions under which the motor current is an accurate estimator of the output torque are determined and incorporated into a recursive estimation technique (e.g., a recursive least squares technique, an unscented Kalman filter) for estimating a spring constant in real-time. The output torque of the module is thus estimated.

In one embodiment, the actuator utilizes a Maxon EC 20 flat motor with a nominal speed of 9300 RPM. The steel pinion gear on the motor's output shaft transfers rotation through a gear train containing three steel and brass compound gears. The cumulative gear ration is 349:1 to create high-torque joints. Such a motor and gear train combination can provide a maximum output torque of 7 Nm and a maximum speed of 33 RPM.

Figure 12:
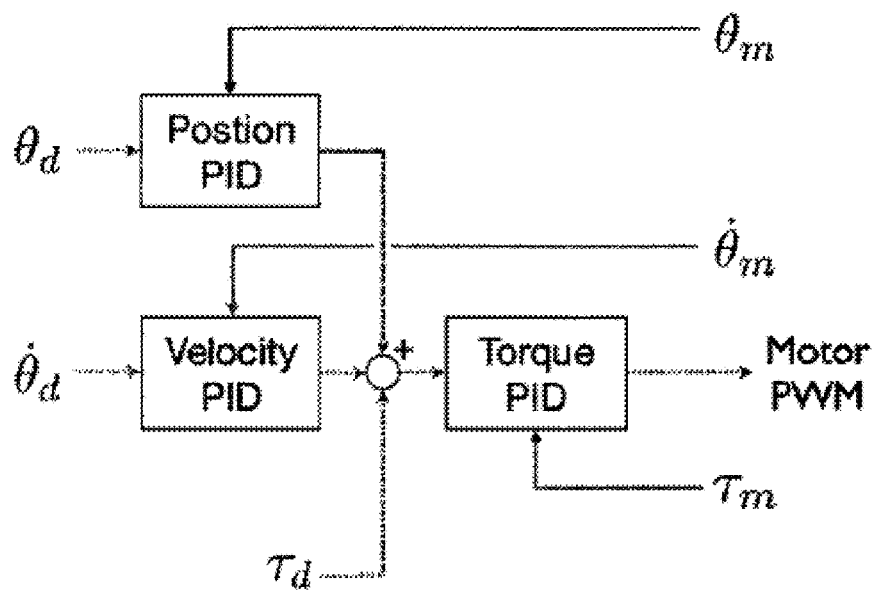
FIG. 12 depicts a block diagram for providing module motion control, such as for the module depicted in FIGS. 6-9.

FIG. 12 depicts a block diagram for providing module motion control, such as for the module depicted in FIGS. 6-9. In the example of FIG. 11, the module supports angular position, velocity, and torque control through cascaded PID control. In one embodiment, each PID controller operates at 1 kHz, although target set points may be updated less frequently (e.g., at 100-200 Hz). Independent position and velocity outer loops generate torque commands, which are combined with a desired feed-forward torque to define a set point for output torque which is maintained by the inner torque controller. The inner torque controller is able to directly compare desired and actual output torque by directly observing spring deflection as the difference between the two encoder positions. This error is used to compute a PWM command to the motor which applies appropriate torque to the input of the spring and gear train. In one example proportional controller, additional features are added to help compensate for common gear train nonlinearities. For example, to prevent oscillations due to gear backlash and sensor noise, a 'deadzone' is added within which errors are assumed to be zero. To overcome gear train stiction, a 'punch' factor can be added. Maximum output limits can also be set for each controller. To mitigate windup of the integral term, its output can be limited to the difference between the PD output and the set output level. For example, using this method, if PD control already reaches this level, the integral term can be reduced to 0.

Figure 13:
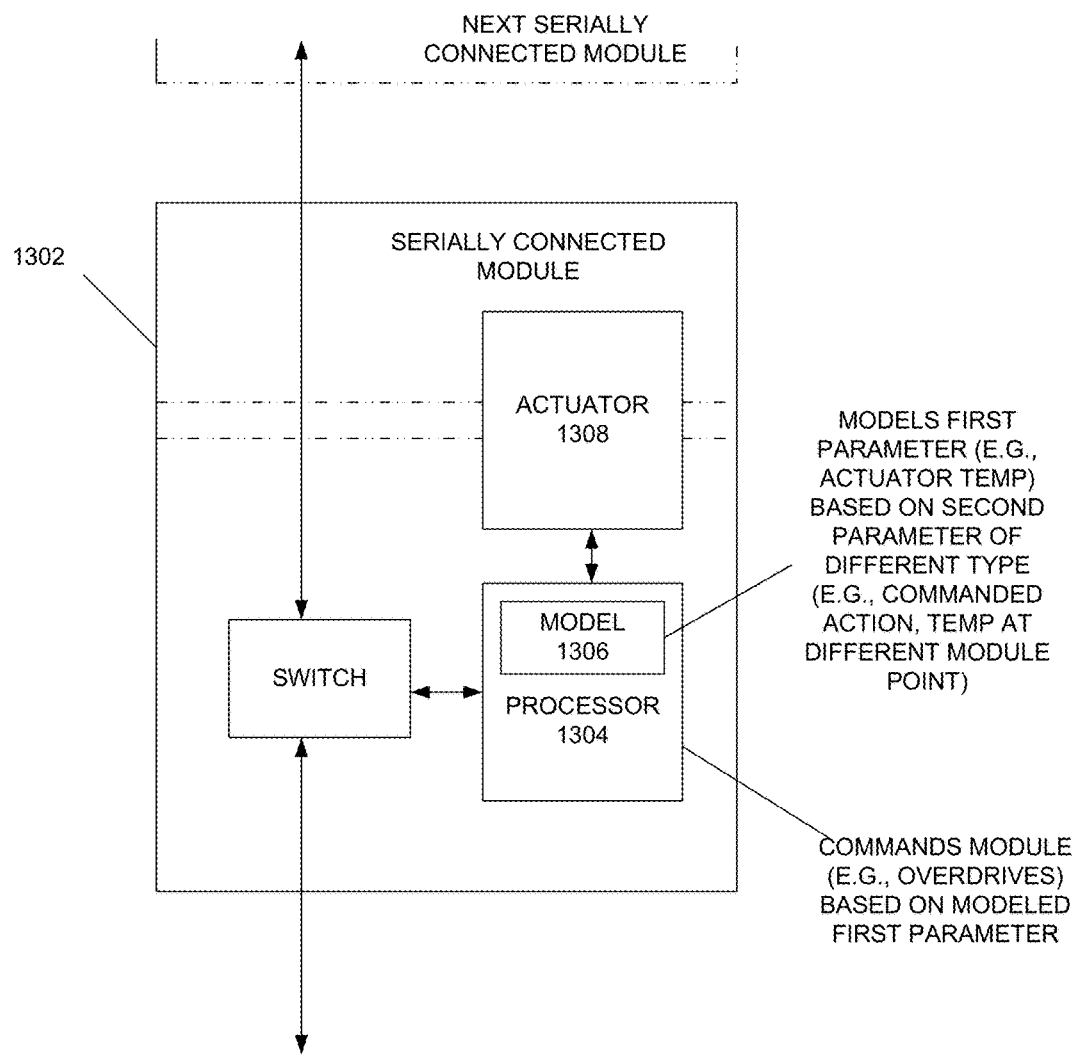
FIG. 13 is a block diagram depicting a module having modeling capabilities at its processor.

Having processor onboard modules within an electro-mechanical system enables a significant amount of intelligence to be distributed amongst the modules. Such intelligence can be used to determine module-level status by the module processors based on high-level commands from an external entity, as described further herein. Module level processing further enables modeling of certain parameters in an attempt to optimally use the capabilities of modules. FIG. 13 is a block diagram depicting a module 1302 having modeling capabilities at its processor 1304. In one embodiment, the data processor 1304 implements a model 1306 for modeling a physical parameter of the module without direct measurement of that physical parameter. For example, the module may include a sensor for measuring a second parameter of a same or different type as the physical parameter to be modeled. Based on the modeled physical parameter, the processor 1304 can take action, such as commanding the actuator 1308 to impart motion on the module 1302 in a certain way.

In one example, the model 1306 operates to estimate a certain temperature within the module 1302. An important challenge for electro-mechanical systems is to safely extract as much performance as possible out of their actuators 1308 without damaging the actuators. For brushless motors, the primary limitation on performance is often heat buildup in the motor windings. Unfortunately, direct measurement of such temperature is difficult due to location inaccessibility. In one embodiment, a module uses online estimation of its actuator motor winding temperature to fully exploit the motor's performance envelope beyond its continuous duty ratings. The estimated winding temperature is based on a second temperature sensor in the module 1302 that is near the motor, the sensed current draw of the motor, and a model of the internal thermal resistances and capacitances of the motor. These inputs are provided to model 1306, which outputs an estimated temperature of the model. If the estimated temperature indicates a sufficiently low temperature, the actuator motor can be overdriven without fear of damaging the motor.

Other parameters may be estimated using a model, as well. In one example, torque sensing is performed using a model. A spring constant of the elastic element described above is calibrated. One approach uses an unscented Kalman filter and a heuristic function that takes into account the motor's motion and current draw. A state estimator incorporates models of hysteresis and other non-linear effects, and integrates this estimator into the firmware of the module 1302. In another example, the spring coefficient of an elastic element is modeled periodically based on certain measurements of other module 1302 parameters of different types. That adjusted spring coefficient can then be used in identifying an amount of torque to be applied to the shaft to produce a desired amount of rotation.

Figure 14:
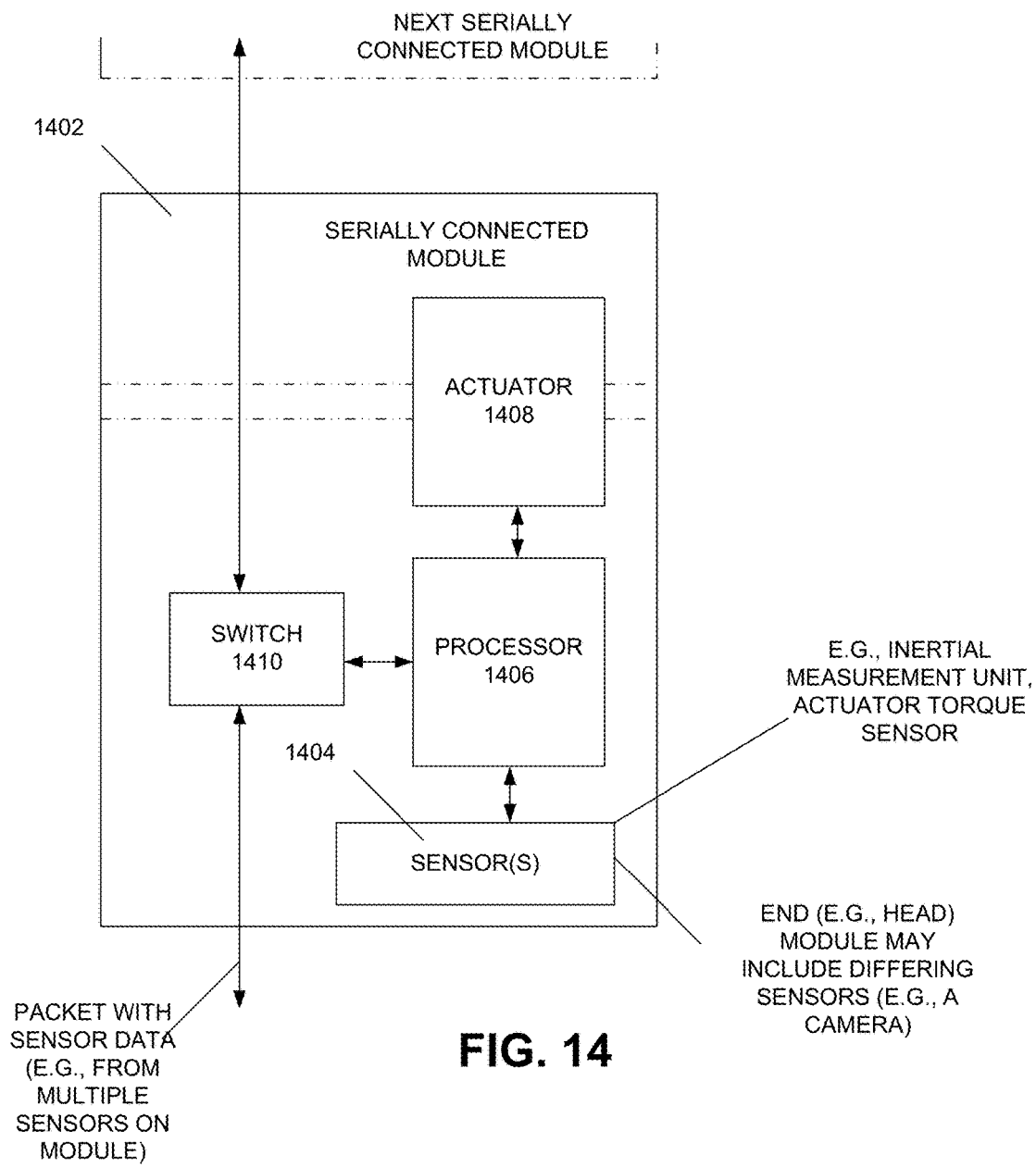
FIG. 14 is a block diagram depicting a module having integrated sensors whose data is provided to a processor and other external entities.

Modules as described herein may include a variety of sensors for sensing their own state and the state of the environment in which they reside. FIG. 14 is a block diagram depicting a module having integrated sensors whose data is provided to a processor and other external entities. A module 1402 includes a suite of one or more sensors 1404 that communicate data to a processor 1406. In one example, certain modules may include sensors for detecting the state of their associated module, such as an inertial measurement unit, a 3-axis gyroscope, a 3-axis accelerometer, a 3-axis magnetometer, a voltage sensor, a temperature sensor, a current sensor, or an actuator torque sensor. Other modules may include different sensors. For instance, a head module of a snake robot configuration could include a camera sensor. Sensor data can be consumed internally by the processor 1406, such as for adjusting operations (e.g., actuator 1408 function) of the module 1402. The module 1402 may further transmit sensor data to its exterior via a communication channel and a switch 1410. When communicating sensor data to another module or to an external entity, the module 1402 may use an Ethernet standard to send sensor data in packet form, where a single packet could contain data from multiple sensors 1404 of the module.

Figure 15:
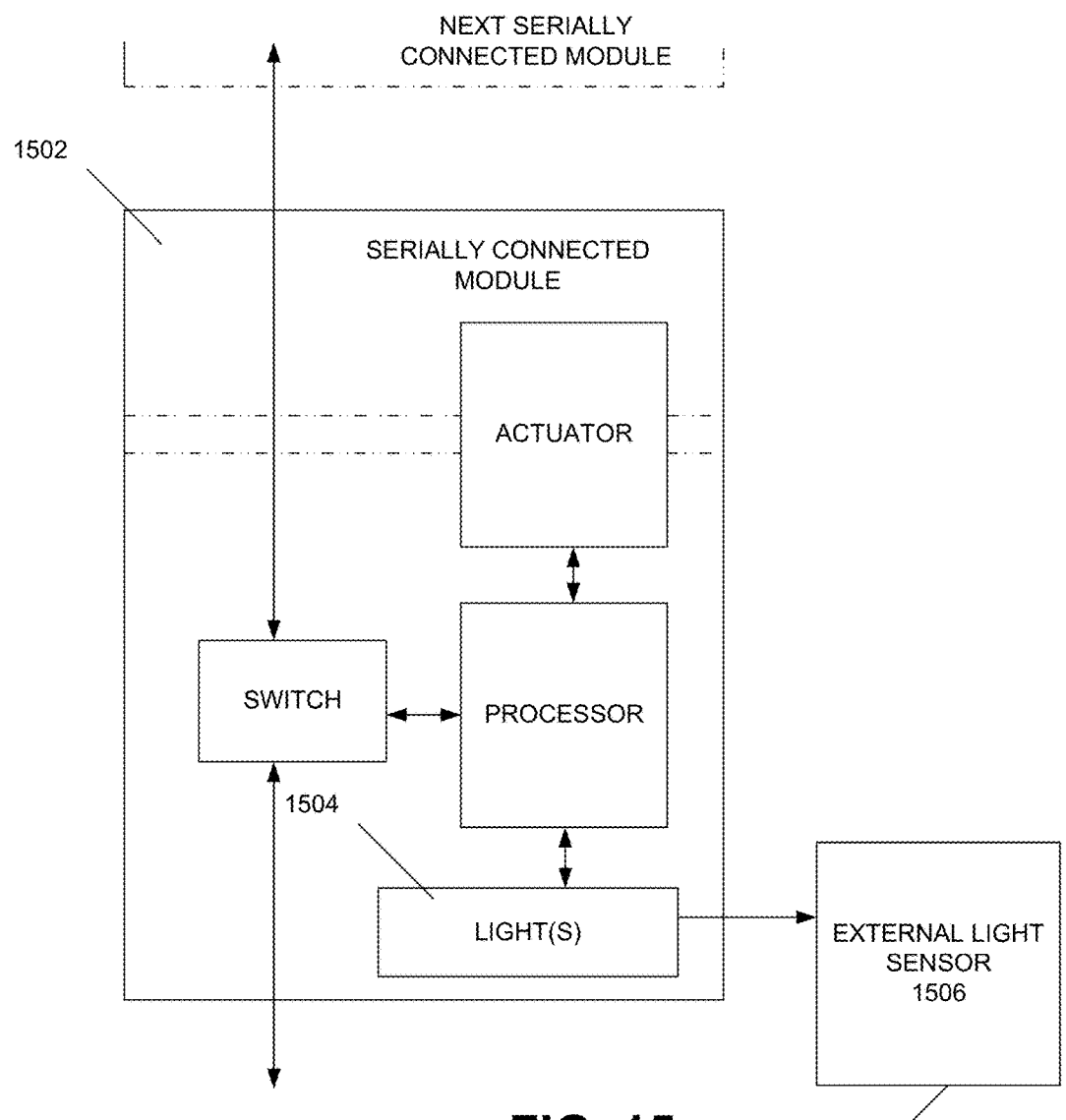
FIG. 15 is a block diagram depicting a module that communicates data to the exterior via one or more lights visible at the exterior of the module.

In addition to communicating data via a communication channel running between modules, a module can transmit data to its exterior in other ways. For example, a module could include wireless communication capability for communicating data to other modules or to external entities. FIG. 15 is a block diagram depicting a module 1502 that communicates data to the exterior via one or more lights 1504 visible at the exterior of the module. The lights are detectable externally to the module 1502 via an external light sensor 1506. Based on light detected by the sensor 1506, that external entity or other module can receive data from the module 1502 or detect a state of the module 1502. For example, a light 1504 may be on when a module is powered such that detection of such light at 1506 indicates that the module 1502 is on to the external entity. In another example, the light is positioned at a certain position of the module 1502, such that detection of the light (or inability to detect the light because it is pointed away from the sensor) at 1506 gives an external entity data about the orientation of the module 1502. Multiple lights of different colors could be positioned at particular points on the module 1502 to give further details on orientation of the module. The lights could also be varied in wavelength, brightness, or pulsed to indicate module 1502 state data or other data that the module 1502 wishes to send, such as values extracted from sensors of the module 1502.

Modules may be configured with certain firmware that provides instructions for an onboard processor and other components. In one embodiment, a firmware core is a real-time operating system (RTOS) that is configured to separate setup and upkeep of various hardware modules into separate thread. In one example ChibiOS/RT is selected for its out-of-the-box support for STM32 Cortex processors and a hardware abstraction layer that supports peripherals such as Ethernet, serial, analog-digital conversion, and pulse-width modulation. Low-level control code can include 1 kHz cascaded PID loops for simultaneous position, velocity, and toque control; steady-state Kalman filtering of actuator velocity; multiple sensor readings, including two encoders and an internal IMU; thermal modeling of motor winding temperature; and identification of adjacent modules to auto-discover an electro-mechanical system's configuration.

Modules may be configured to communicate with each other and external entity client software via a messaging protocol, such as Google Protocol Buffer messages. Protocol Buffers define a fixed serialization format for typed data structures that are supported across multiple computing platforms. The Google C++ library can be ported for Protocol Buffers to ChibiOS to allow messages to be encoded and decoded on the module. In one embodiment, remote-procedure calls (RPC) are used. In another embodiment, a single "meta"-message is defined that defines a number of optional fields that can encode module parameters and data streams. A computing environment with Protocol Buffer support can then interact with the electro-mechanical system by sending and receiving of these meta-messages. Such a protocol can be implemented being fundamentally stateless, and messages can be handled transactionally, naturally supporting multiple concurrent asynchronous connections. The protocol can be exposed identically over Transmission Control Protocol (TCP) sockets, User Datagram Protocol (UDP) sockets, and a serial interface between modules, allowing a variety of flexible communication strategies to be used in various situations, depending on available bandwidth, required level of control, and interface hardware. Modules can propagate local information, such as their configuration, by exchanging data over a serial interface to neighboring modules.

An electro-mechanical system can utilize certain software architectural styles as a foundation for its framework. A first, pipe- and filter style is a data flow pattern often found in systems that process real-time data. The style typically consists of two elements: filters that apply incremental transformations to data streams and pipes which are unidirectional connectors between filters. Filters have no knowledge of the identities of other filters and share no state between each other.

In one embodiment, a Lightweight Communications and Marshalling (LCM) framework is utilized as the message passing framework for inter-process communications. LCM is a low-latency publish-subscribe implementation that uses UDP multicast as the basis for broadcasting messages to components. Using multicast means that, unlike TCP based message passing services, LCM does not require a centralized manager to forward data to appropriate subscribers. This enables components to communicate directly and to be started and stopped at any time and in any order. This lower overhead may come at the price of guaranteed delivery. In one example, such guaranteed delivery can be restored using other mechanisms. Communications that require reliable delivery (such as that provided by TCP) could be handled using other mechanisms. LCM supports several languages including C, C++, Java, Python, and MATLAB, and supports Windows, Linux, Mac, and some embedded platforms.

For control and estimation of robotic systems, typical filters (e.g., pose estimation or high-level autonomous control behaviors) can be more effective if their internal state and parameters are visible to and dynamically modifiable by a human operator at run-time. This allows for more efficient debugging and parameter tuning, and is often required for cases of supervised autonomy. Because of these reasons, a standard way to interface with various filter-elements at runtime can be adopted, even when there is no prior knowledge of the active elements and their internal parameters. To further complicate the challenge, filters can differ significantly in purpose, method, and perhaps even language in which they are implemented. For example, MATLAB can be used for prototyping and developing filters and controls with complex math operations, C/C++ can be used for stable code that has significant performance requirements, and Java can be used for filters that need to run cross platform.

To address this, a system can define the concept of behaviors, or filter blocks with common interface elements called behavior parameters that are visible and modifiable at run-time through an event bus. While this can use the same publish-subscribe framework as the pipe-and-filter structure mentioned previously, it can be conceptually separate. A behavior parameter is a simple data object combining a typed variable and an allowed range for its values (allowing constraints such as restricting a PID constant to be strictly positive). A system can dedicate two event channels for the behavior mechanism. The first is a parameter change channel on which parameter change events get published. Behaviors listen to this channel and react to events for which they are targets. The second channel is a behavior state broadcast channel on which individual behaviors publish their full internal state whenever one of their parameters changes or upon request.

Figure 16:
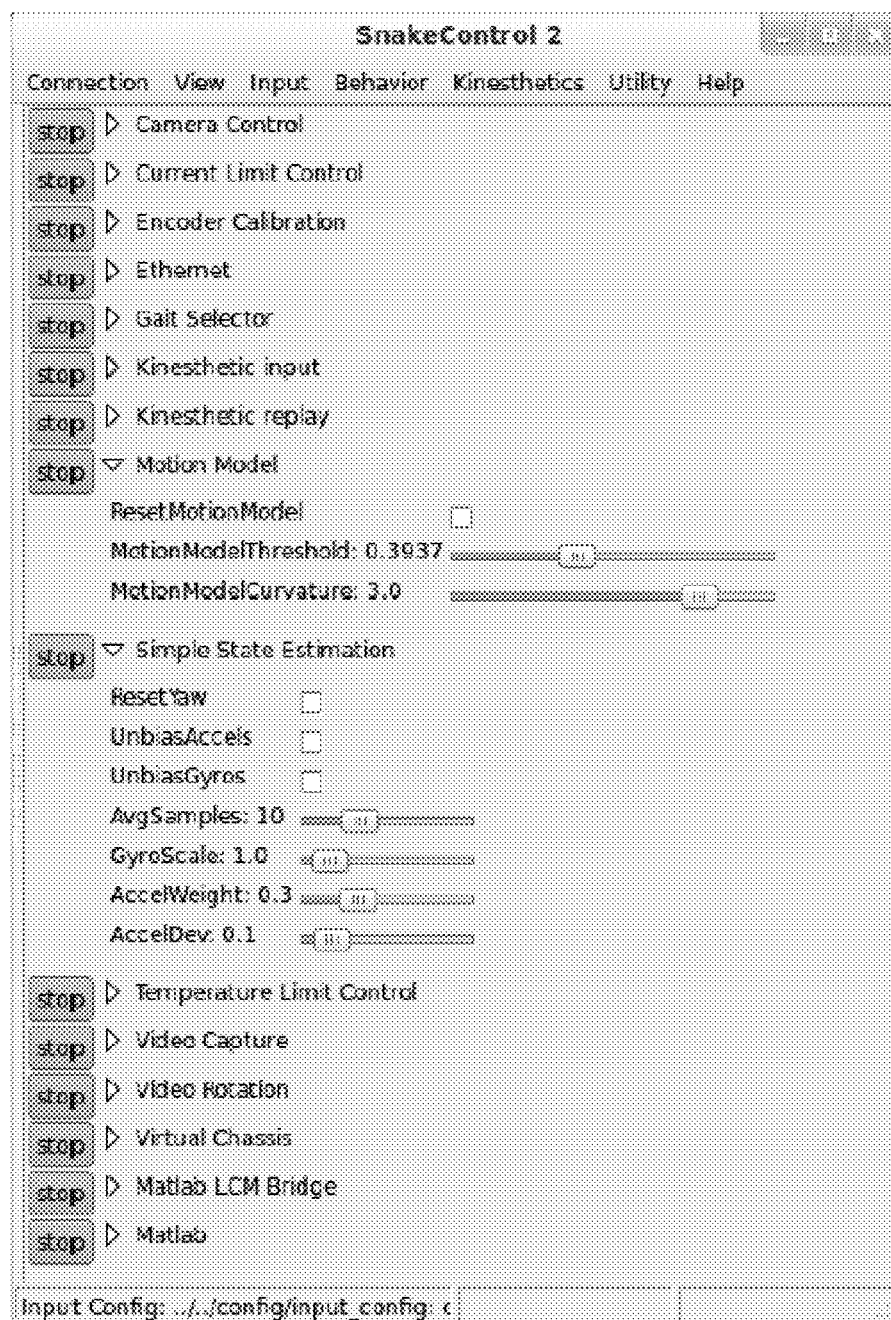
FIG. 16 depicts an example user interface which allows operators to perform a variety of functions.

In one embodiment, a system implements behaviors in C++, Java, and MATLAB. FIG. 16 depicts an example user interface which allows operators to: observe any running behaviors on the network; stop active behaviors; start known inactive behaviors; and view and change behavior parameters through appropriate controls. Such an interface allows for a simple and generic way to modify internal behavior parameters without requiring modifications to underlying code.

The firmware and/or software encoded on a module can perform a variety of functions. Such firmware and/or software at the module level can be updated on an as-needed or as-desired basis via updates transmitted over the module communication channel, such as the Ethernet channel described in certain embodiments herein. In one embodiment, modules can be configured to perform operations to identify their configuration in an electro-mechanical system. For example, in an electro-mechanical system having a series of connected modules, the modules can be configured to determine the order in which they appear in the series (e.g., first, second, third in a snake or leg of an electro-mechanical system). Such detection can take the place of manual identification (e.g., manual setting of IP addresses), enabling faster and more flexible plug-and-play type setup.

Figure 17:
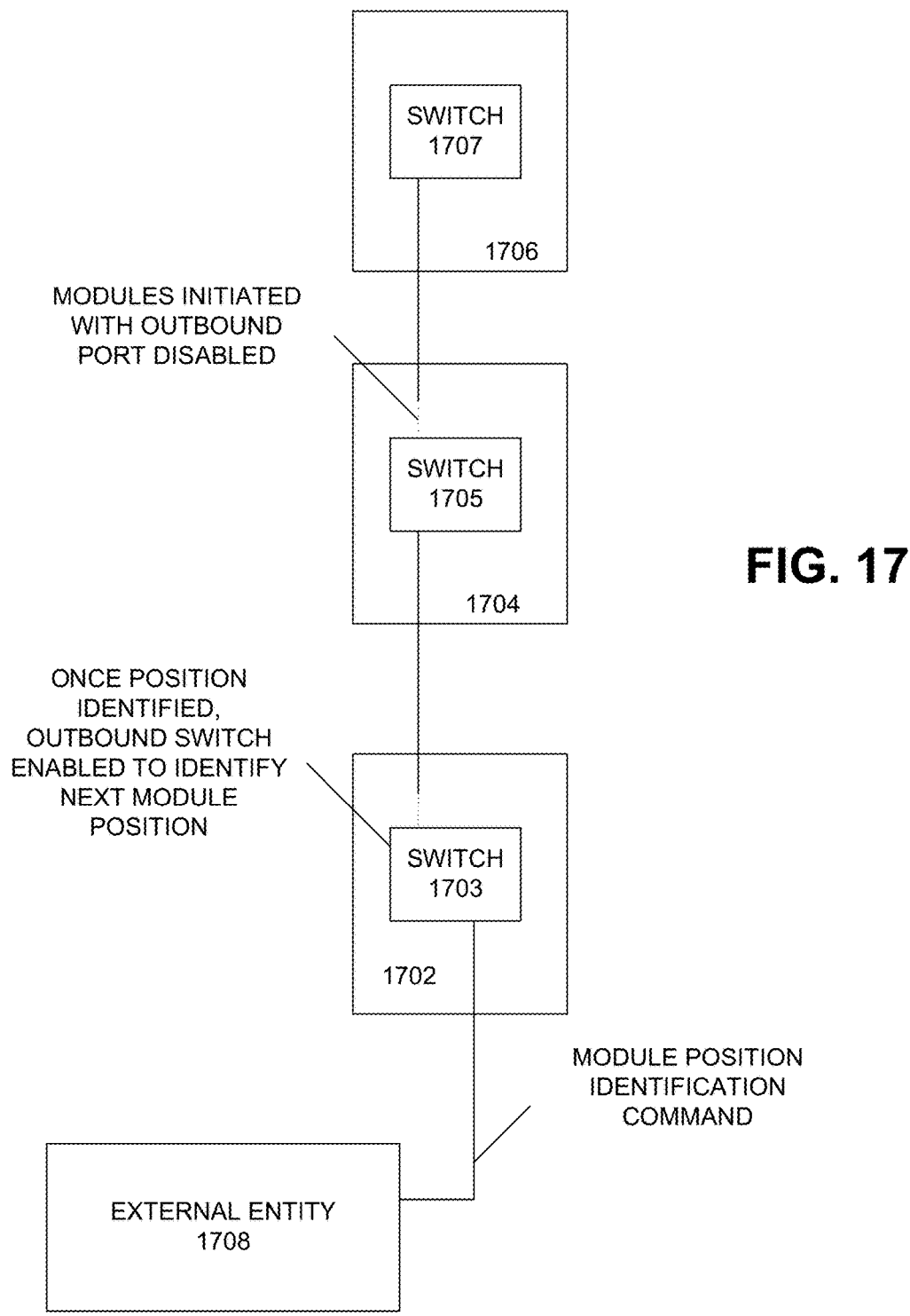
FIG. 17 is a block diagram depicting one mechanism for modules to identify their position in a series of modules.

FIG. 17 is a block diagram depicting one mechanism for modules to identify their position in a series of modules. The diagram depicts a plurality of modules 1702, 1704, 1706, each including a switch 1703, 1705, 1707, respectively. The modules 1702, 1704, 1706 are connected to an external entity 1708, from which commands are received. In one embodiment, the external entity 1708 issues commands to the modules 1702, 1704, 1706 to identify the position of the modules in the series. Once a module knows its position, it can respond to commands and data directed to it from the external entity 1708 or other modules. In one example, the modules 1702, 1704, 1706 and the external entity 1708 are configured to detect a number of modules (n) that are incorporated into the system and a position of those modules in the system. This can be accomplished by commanding all of the modules 1702, 1704, 1706 to open the incoming port of their switches 1703, 1705, 1707 and close the output port of those switches. A signal is transmitted by the external entity 1708 (e.g., a packet saying that this is a message for the first module) along the communication channel that runs through the series of modules 1702, 1704, 1706. Only the first module 1702 will receive that signal because the outbound port of switch 1703 is closed. When the first module 1702 receives the signal, it stores an indicator that it is the first module in the series. The first module 1702 then opens the outbound port of its switch 1703 and sends an acknowledgment to the external entity 1708. The external entity 1708 then sends a second signal that is received by the first module 1702 and the second module 1704. The first module, already having been identified as first-in-line ignores the signal, while the second module 1704 realizes that it is second in line and stores an indicator of that fact. The second module 1704 opens the outbound port of its switch 1705 and sends an acknowledgment to the external entity 1708 and the process repeats. The process is repeated until no acknowledgment is received by the external entity 1708. Based on this lack of acknowledgment, the external entity 1708 then knows the number of modules (e.g., 3) in the series of connected modules.

In other embodiments, other mechanisms can be utilized for modules to identify their topology and ordering. In one embodiment, modules are configured to change operational characteristics (e.g., switching send and receive ports on a serial interface), where neighboring modules can detect changed characteristics and ascertain their relative positioning.

Figure 18:
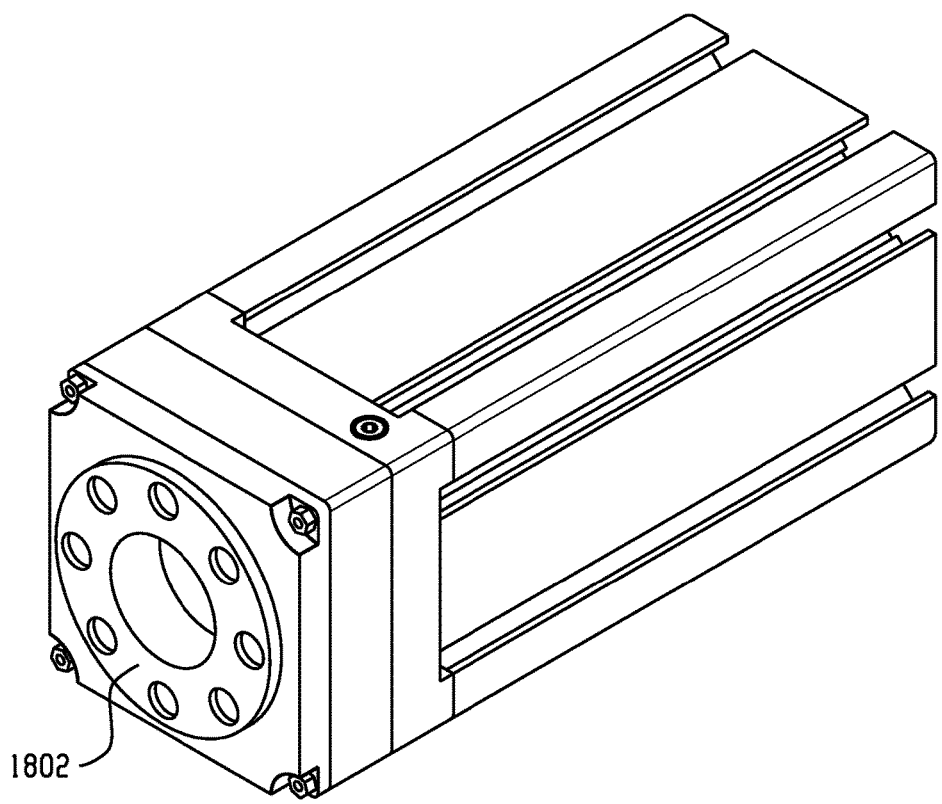
FIGS. 18-20 depict a T-slot compatible module for imparting a torque on a wheel and an external component connected to the wheel.
Figure 19:
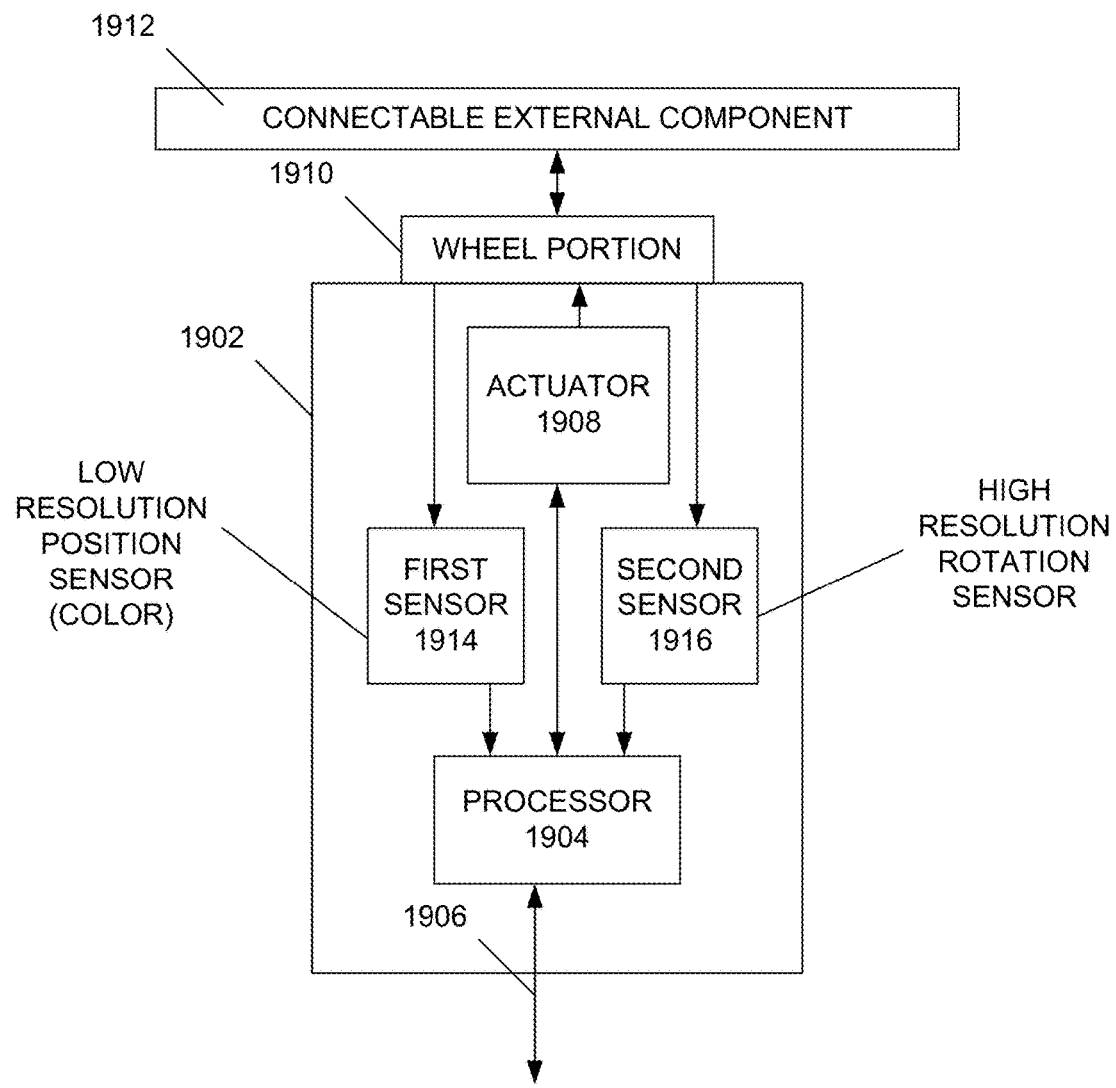
Figure 20:
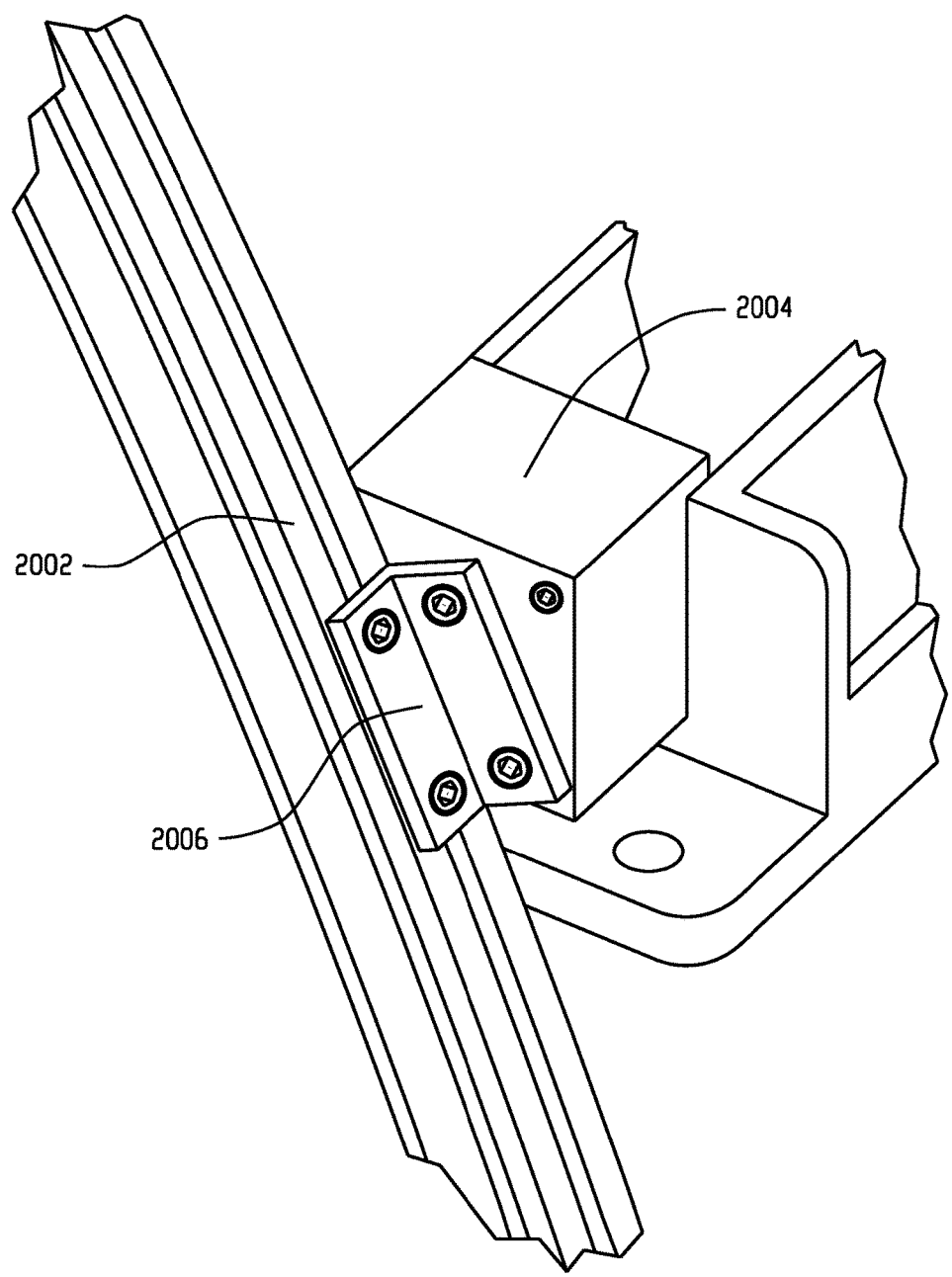

Modules in an electro-mechanical system may take a wide variety of forms. FIGS. 18-20 depict a T-slot compatible module for imparting a torque on a wheel and an external component connected to the wheel. A T-slot compatible module, as depicted in FIG. 18, is compatible with existing T-slot compatible hardware, where the module includes T-slots on its four sides for easy connection. In one embodiment, the module utilizes standard T-slot aluminum (e.g., compatible with 80/20 brand 10-series products) and uses standard 1-inch bolt patterns to enable connection into existing setups and new designs with little time and effort.

The T-slot compatible module includes an integrated servoactuator for imparting a torque on a wheel portion 1802 of the module. Hardware can be attached to the wheel portion 1802, such as via integrated screw receptors. The actuator applies a torque to the wheel portion 1802 which imparts rotational motion on a turnable body connected to the wheel portion. The T-slot compatible module is connectable to other modules both physically and for communication of data. At the electrical level, the communication can be handled over standard Ethernet using Google's extensible Protocol Buffers protocol. The module can include sensors that enable 3-axis inertial measurement, controllable motor velocity, and high-bandwidth controllable torque output through a dual-encoder series elastic stage after the gear train.

FIG. 19 is a block diagram depicting example components of the T-slot compatible module of FIG. 18. The module 1902 includes a processor 1904 that is configured to communicate to the outside of the module 1902 via a communication channel 1906. An actuator 1908 is responsive to the processor 1904 for imparting motion in the module 1902 by rotating a wheel portion 1910 of the module 1902 on command. The wheel portion 1910 is configured to have an external component 1912 connected to it (e.g., via screws or other fasteners), such that the rotation of the wheel portion 1910 also rotates the external component 1912. In one embodiment, a position of the wheel portion 1910 is monitored, such as part of a feedback loop to the processor 1904 to maintain proper positioning of the wheel portion 1910. In one example, such position sensing is performed using a pair of sensors, a low resolution first sensor 1914 and a high resolution second sensor 1916. The low resolution first sensor 1914 indicates a starting position of the wheel portion 1910, such as optically using a color wheel positioned on the inside-facing face of the wheel portion, where a color at a certain position is observed by the first sensor 1914. The high resolution second sensor 1916 accurately measures rotation from the initial position detected by the first sensor 1914. In combination, the measurements from the two sensors 1914, 1916 are used by the processor 1904 to determine a current positioning of the wheel 1910. FIG. 20 is a photograph depicting a beam 2002, connected to a module 2004 having a rotatable wheel portion that is rotated by an actuator. The beam 2002 is connected to the module 2004 via a bracket and screws 2006. While the examples of FIGS. 18-20 depict imparting a torque on a wheel component of a module, in other examples, torques and rotations can be imparted in other structures of modules as well as external structures connected to modules.

Figure 21:
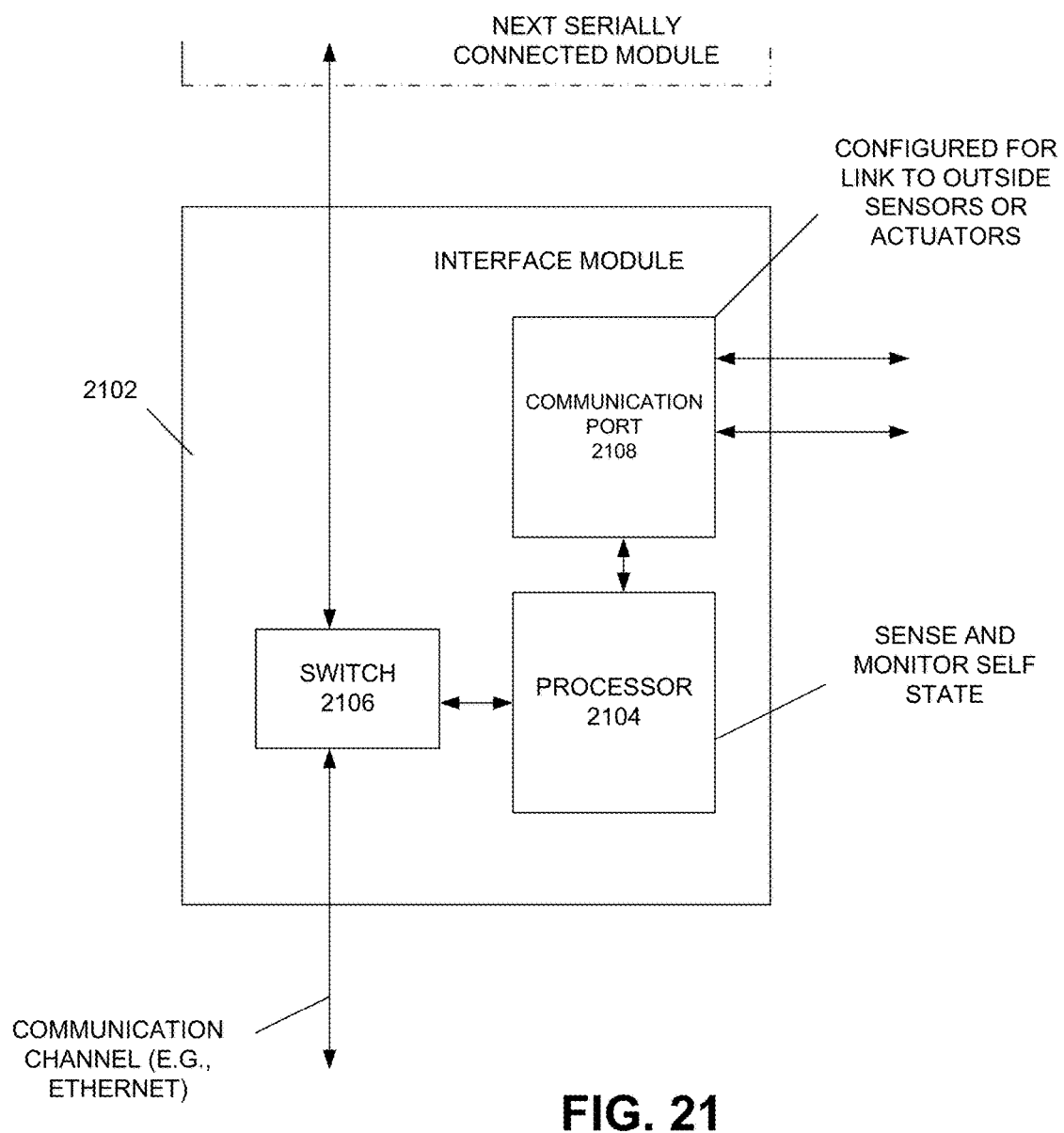
FIG. 21 is a diagram depicting an interface module that includes no internal actuators or sensors.

Modules can take a variety of other forms as well. FIG. 21 is a diagram depicting an interface module that includes no internal actuators or sensors. Similar to other modules described herein, the module 2102 of FIG. 21 includes a processor 2104 and a switch 2106 that interacts with a communication channel to communicate with other modules or an external entity. The module 2102 of FIG. 21 further includes a communication port 2108. External actuators or sensors can be connected to the communication port 2108 (e.g., via a USB connection) to provide extra capabilities to the electro-mechanical system. In one embodiment, such external peripherals can be incorporated into the system in a plug-and-play fashion, communicating with other entities via an Ethernet communication channel, offering a high degree of system customization.

Figure 22:
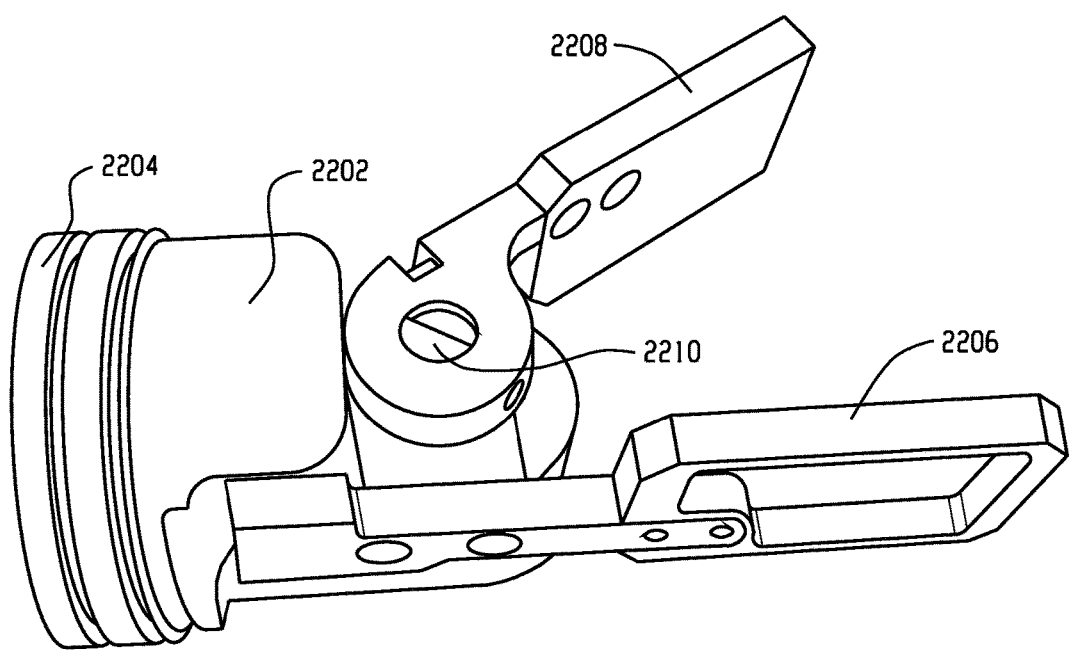
FIG. 22 depicts another module type in the form of a gripper module.

FIG. 22 depicts another module type in the form of a gripper module. The gripper module 2202 includes an interface portion 2204 for facilitating both a physical and data connection to other modules or other outside entities. The gripper portion includes two paddles 2206, 2208 that can be controllably manipulated via a processor and actuator to perform desired functions, such as gripping functions. In the embodiment of FIG. 22, a first paddle 2206 is rigidly attached to the gripper module 2202 and does not move. A second paddle 2208 is connected to the gripper module 2202 via a shaft 2210 that is rotatable by the actuator that is internal to the gripper module 2202. The module 2202 may include a variety of sensors for enhancing the operation of the gripper module 2202. A torque sensor could be incorporated with an internal elastic actuator to provide feedback as to whether the second paddle 2208 has been moved to a desired position. A force sensor could be incorporated to sense an amount of force felt by one of the paddles. Limitations on such force in a control algorithm operated by a processor internal to the gripper module 2202 could enable gentle gripping by the gripper module without damage to the module 2202 or objects being grasped. The gripper module 2202 could be incorporated into a wide variety of electro-mechanical systems, including the multi-legged robot of FIG. 4, where such a gripper module could operate as a head module (e.g., a mouth) or at the end of one or more of the legs (e.g., as hand(s)).

Figure 24:
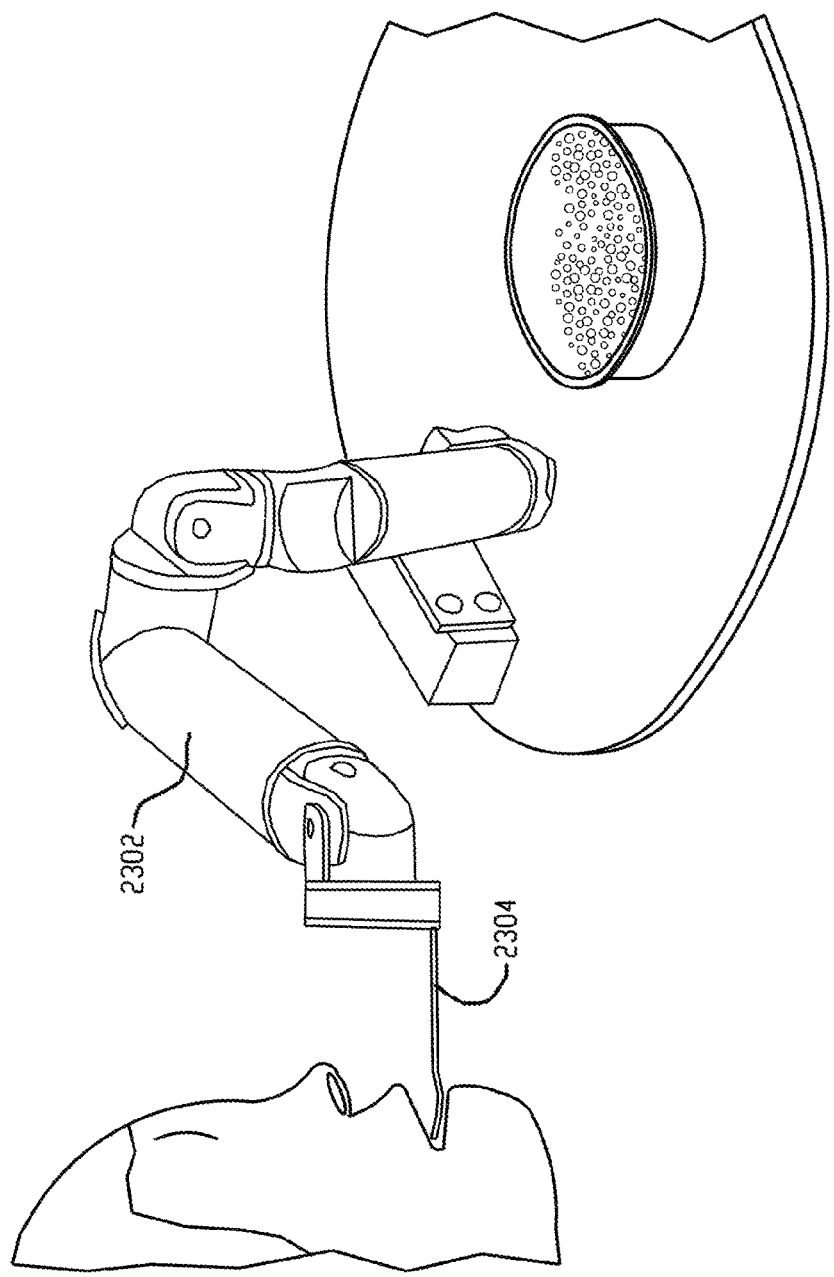
Figure 25:
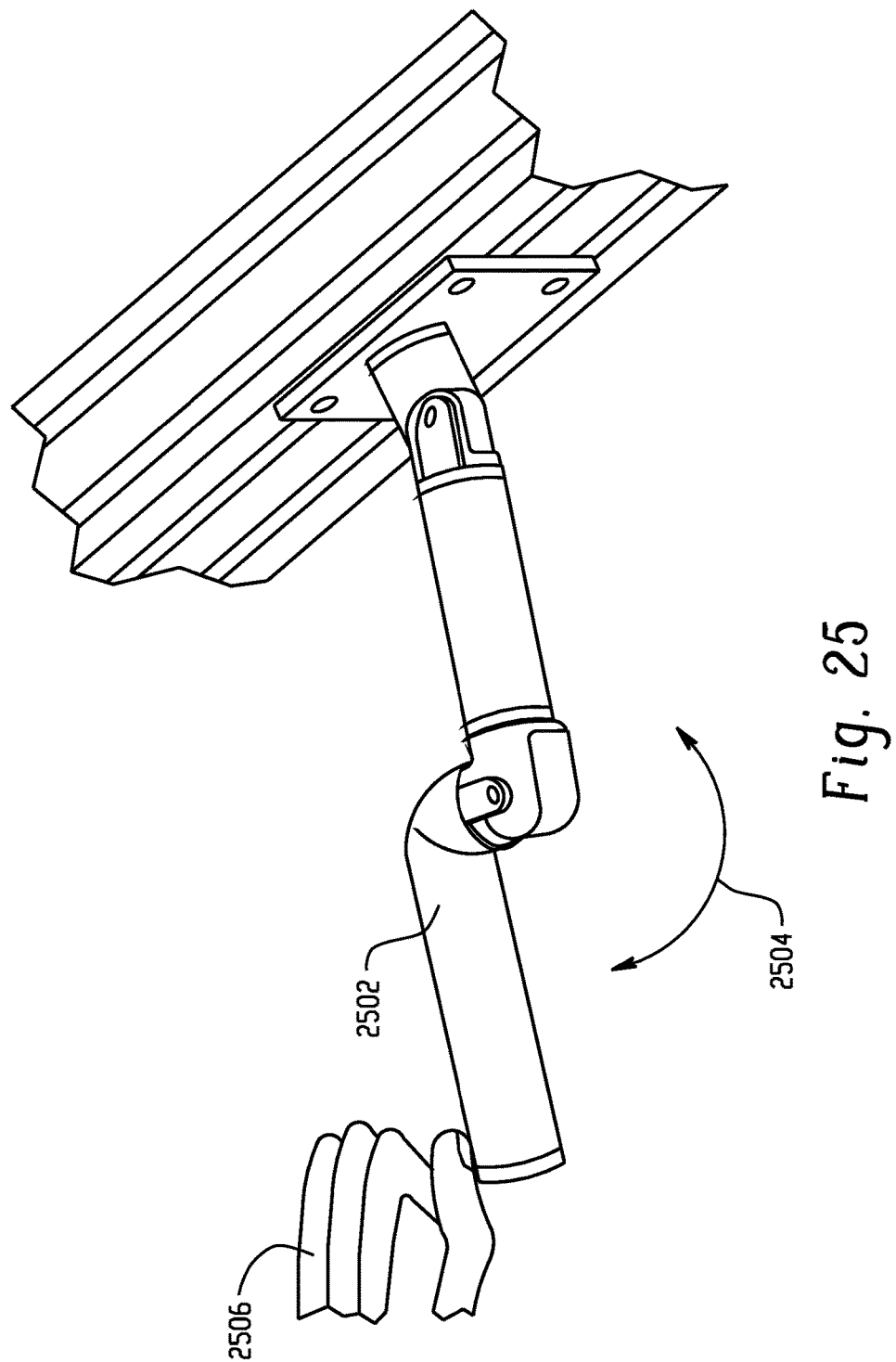

FIGS. 23-25 depict example operations of electro-mechanical systems. FIGS. 23-24 depict an electromechanical system 2302 having a fork 2304 connected, the system 2302 being configured to pierce food onto the fork 2304 and translate that food to a person's mouth. The example of FIGS. 23-24 illustrates a soft real time/hard real time software configuration. The system is trained by manually positioning the electromechanical system 2302 at a number of positions (e.g., piercing food, 3 positions along the translation to the mouth, and a final position depicted in FIG. 24 where food is removed by the mouth). Those positions of the electro-mechanical system are recorded by an external entity. The external entity then commands playback of those positions as soft real time commands to the modules of the electro-mechanical system 2302. Those soft real time commands indicate a result to be achieved (i.e., the electro-mechanical system at one of the recorded positions). The processors of the modules of the electro-mechanical system 2302 are configured to achieve the commanded positions based on self-sensing of their current position and configuration. The module processors issue commands to their actuators as hard real time commands that must be completed in a known period of time, where those actuator operations in concert produced the desired system 2302 configuration.

FIG. 25 depicts an electro-mechanical system 2502 configured to rotate in a plane, as indicated at 2504. A sensor in one of the modules of the system 2502 detects an obstruction, provided in the example of FIG. 25 by a hand 2506. Such sensing could be performed in a variety of manners, such as a sensing of increased torque needed to provide the commanded motion, an accelerometer, a vibration sensing, or otherwise. In one embodiment, upon sensing an unexpected system event, such as the interruption by the hand, the modules of the system 2502 are configured to take a protective action to mitigate damage to the system 2502 or the obstruction 2506. For example, the system 2502 may be configured to stop, reverse direction, or determine a different path for reaching their commanded end point as programmed, preferably to maintain the safety of the system 2502 and the obstruction 2506. Thus, in one embodiment, an anomaly detected by a sensor at one module can be utilized globally in the electro-mechanical system, which in one embodiment results in coordinated action based on the detected anomaly.

This written description uses examples to disclose the invention, include the best mode, and also to enable a person skilled in the art to make and use the invention. The patentable scope of the invention may include other examples that occur to those skilled in the art.

It is claimed:

1. An electro-mechanical system, comprising:
 a plurality of connected modules, a first module of the modules comprising:
    an actuator for imparting motion on the electro-mechanical system;
    a data processor configured to sense a state of the first module and to command the actuator to modify the state of the first module to fulfill a received command;
    a three port switch, wherein a first port is configured for communication with a second module, wherein a second port is configured for communication with a third module, and wherein a third port is configured for communication with the data processor.

2. The system of claim 1, wherein at least two of the connected modules are identical modules.

3. The system of claim 1, wherein the first module is configured to have one degree of freedom in a first plane;
 wherein a second module that is connected to the first module is configured to have one degree of freedom in a second plane that differs from the first plane.

4. The system of claim 3, wherein the second plane is orthogonal to the first plane.

5. The system of claim 3, wherein a first end of the first module is configured to rotate relative to a second end of the first module in the first plane.

6. The system of claim 1, wherein the first module further comprises an interface for achieving a physical connection and a data connection with a second module of the connected modules.

7. The system of claim 6, wherein the interface of the first module includes a threaded collar configured to connect to an interface of the second module.

8. The system of claim 6, wherein the first module is configured to communicate with the second module via an Ethernet standard.

9. The system of claim 8, wherein the first module is further configured to communicate with an external entity via the Ethernet standard;
 wherein all communications among the first module, the second module, and the external entity are via the Ethernet standard.

10. The system of claim 1, wherein the system is configured to operate utilizing between 2 and N connected modules, wherein N is an integer greater than 2.

11. The system of claim 1, wherein the system is configured to detect a number n of the connected modules that are incorporated into the system, wherein n is an integer greater than 2, and wherein the first module is configured to determine its position in a series of at least two connected modules.

12. An electro-mechanical system, comprising:
 a plurality of connected modules, a first module of the modules comprising:
    an actuator for imparting motion on the electro-mechanical system;
    a data processor configured to sense a state of the first module and to command the actuator to modify the state of the first module to fulfill a received command;
 wherein the first module is configured to determine its position in a series of at least two connected modules, wherein the first module is configured to determine its position by:

enabling an input port to the first module and disabling the output port of the first module and other modules in the series on initialization;

transmitting a signal from an external entity to an initial module in the series of module, wherein only the initial module will receive the signal based on the disabled output port of the first module;

storing an indicator at the initial module that it is module number one;

enabling the output port of the initial module;

transmitting a second signal from the external entity, wherein the initial module and an immediately following module receive the second signal based on the disabled output port of the following module;

storing an indicator at the following module that it is module number two.

13. An electro-mechanical system, comprising:
a plurality of connected modules, a first module of the modules comprising:
an actuator for imparting motion on the electro-mechanical system;
a data processor configured to sense a state of the first module and to command the actuator to modify the state of the first module to fulfill a received command;
wherein the first module is configured to determine its position in a series of at least two connected modules, wherein the first module is configured to determine its position by detecting a change in a configuration characteristic of a second module that is connected directly to the first module.

14. The system of claim 13, wherein the configuration characteristic change is a swapping of a transmit and a receive channel at the second module.

15. An electro-mechanical system, comprising:
a plurality of connected modules, a first module of the modules comprising:
an actuator for imparting motion on the electro-mechanical system;
a data processor configured to sense a state of the first module and to command the actuator to modify the state of the first module to fulfill a received command;
wherein the first module is configured to determine its position in a series of at least two connected modules, wherein the data processor implements a model for modeling a physical parameter of the first module based on a second parameter of a different type than the physical parameter, wherein the data processor is configured to command the actuator based on the modeled physical parameter.

16. The system of claim 15, wherein the physical parameter is a temperature parameter, wherein the data processor is configured to overdrive the actuator beyond a threshold based on the modeled temperature parameter being below a predefined level.

17. The system of claim 15, wherein the physical parameter is a spring coefficient of an elastic component of the actuator, wherein the first module is configured to periodically calibrate to adjust the spring coefficient.

18. The system of claim 17, wherein the data processor is configured to command the actuator to apply a torque to the elastic component based on a desired position of the first module and the adjusted spring coefficient.

19. The system of claim 1, wherein the first module is configured to transmit sensor data from a plurality of sensors to an external entity in packet form, wherein a single packet contains data from multiple sensors associated with the first module.

20. The system of claim 1, wherein the system is further configured to include a unique module that is different from all other modules.

21. The system of claim 1, wherein the system is configured to comprise a module that includes a servoactuator configured to apply a torque on a wheel portion of the servoactuator module.

22. The system of claim 21, wherein the wheel portion is configured to be connected to a turnable body.

23. An electro-mechanical system, comprising:
a plurality of connected modules, a first module of the modules comprising:
an actuator for imparting motion on the electro-mechanical system;
a data processor configured to sense a state of the first module and to command the actuator to modify the state of the first module to fulfill a received command;
wherein the system is configured to comprise a module that includes a servoactuator configured to apply a torque on a wheel portion of the servoactuator module, wherein the wheel portion is configured to be connected to a turnable body;
wherein a state of the wheel portion is detected based on an initial low resolution measurement and a plurality of subsequent high resolution measurements.

24. The system of claim 23, wherein the low resolution measurement identifies an approximate position of the wheel portion, and wherein the high resolution measurements identify rotation of the wheel portion from the approximate position.

25. An electro-mechanical system, comprising:
a plurality of connected modules, a first module of the modules comprising:
an actuator for imparting motion on the electro-mechanical system;
a data processor configured to sense a state of the first module and to command the actuator to modify the state of the first module to fulfill a received command;
wherein the system is configured to comprise a module that includes a servoactuator configured to apply a torque on a wheel portion of the servoactuator module, wherein the servoactuator module comprises a plurality of T Slot frame portions.

26. An electro-mechanical system, comprising:
a plurality of connected modules, a first module of the modules comprising:
an actuator for imparting motion on the electro-mechanical system;
a data processor configured to sense a state of the first module and to command the actuator to modify the state of the first module to fulfill a received command;
wherein the first module comprises one or more lights, wherein a camera external to the first module determines a state of the first module based on the one or more lights.

27. The system of claim 26, wherein the state is determined based on a color, brightness, or flashing of the one or more lights.

28. The system of claim 1, wherein a first command is transmitted from an external entity to the first module as a soft real time command, wherein, based on the first command, the data processor issues a second command to the actuator that is a hard real time command.

29. The system of claim 1, wherein a first command is transmitted from an external entity to the first module that commands an end result of the system comprising the plurality of connected modules, wherein the data processor of the first module and data processors of other modules determine intermediate commands to associated actuators to achieve the end result.

30. The system of claim 1, further comprising a head module that is connected to exactly one of the connected modules, wherein the head module includes one or more sensors that are not included on the connected modules.

31. The system of claim 30, wherein the head module includes a camera sensor.

32. The system of claim 1, further comprising a tail module that is connected to exactly one of the connected modules, wherein the tail module includes a communication mechanism for communicating with an external entity, wherein the communication mechanism is a wired or wireless communication mechanism.

33. The system of claim 1, wherein communications among the connected modules or between an external entity and the first module are encrypted.

34. The system of claim 1, further comprising an interface module, wherein the interface module is connected to one of the connected modules, wherein the interface module does not include an integral degree of freedom, wherein the interface module includes one or more ports for connection to a sensor or an actuator.

35. The system of claim 1, wherein the first module is configurable to be connected with other modules to form a snake robot; and wherein the first module is configurable to be connected with other modules to form a multi-legged robot having 1 to n legs, wherein n is an integer greater than 1.

36. The system of claim 1, wherein the electro-mechanical system is a robot.

37. The system of claim 1, wherein the electro-mechanical system is a system used in automation.

* * * * *

UNITED STATES PATENT AND TRADEMARK OFFICE
CERTIFICATE OF CORRECTION

PATENT NO. : 9,597,796 B2
APPLICATION NO. : 14/708360
DATED : March 21, 2017
INVENTOR(S) : David Rollinson et al.

It is certified that error appears in the above-identified patent and that said Letters Patent is hereby corrected as shown below:

In the Specification

Column 1, Line 16, add --This invention was made with United States government support under W911NF-11-1-0061 awarded by the Army Research Laboratory. The U. S. government has certain rights in the invention.--

Signed and Sealed this
Fourteenth Day of September, 2021

Drew Hirshfeld
*Performing the Functions and Duties of the
Under Secretary of Commerce for Intellectual Property and
Director of the United States Patent and Trademark Office*